United States Patent
Hong et al.

(10) Patent No.: US 10,075,409 B2
(45) Date of Patent: Sep. 11, 2018

(54) TERMINAL AND APPLICATION SYNCHRONIZATION METHOD THEREFOR

(71) Applicant: Samsung Electronics Co., Ltd., Suwon-si, Gyeonggi-do (KR)

(72) Inventors: Youngki Hong, Seoul (KR); Gunuk Lee, Seoul (KR); Jinhyoung Kim, Seoul (KR); Yongseok Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 272 days.

(21) Appl. No.: 14/304,288

(22) Filed: Jun. 13, 2014

(65) Prior Publication Data

US 2014/0368332 A1     Dec. 18, 2014

(30) Foreign Application Priority Data

Jun. 14, 2013  (KR) .................. 10-2013-0068602
Apr. 3, 2014   (KR) .................. 10-2014-0039814

(51) Int. Cl.
*H04L 12/58* (2006.01)

(52) U.S. Cl.
CPC .................. *H04L 51/38* (2013.01)

(58) Field of Classification Search
CPC ....................................... H04L 51/38
USPC ........................................... 709/248
See application file for complete search history.

(56) References Cited

U.S. PATENT DOCUMENTS

| 5,844,934 A * | 12/1998 | Lund ............. H04B 1/69 370/342 |
| 7,620,658 B2 * | 11/2009 | Benson .......... G06F 17/30575 |
| 8,032,907 B2 * | 10/2011 | Pocock ............. H04H 60/44 725/105 |
| 8,886,598 B1 * | 11/2014 | Emigh ............ G06Q 10/109 707/620 |
| 2002/0078072 A1 * | 6/2002 | Tan ................. G06F 9/546 |

(Continued)

FOREIGN PATENT DOCUMENTS

WO  2013/032237 A1  3/2013
WO  2014/142610 A1  9/2014

OTHER PUBLICATIONS

Merriam-Webster, "blacklist", 2016.*

(Continued)

*Primary Examiner* — O. C. Vostal
(74) *Attorney, Agent, or Firm* — Jefferson IP Law, LLP

(57) ABSTRACT

A method and apparatus for application synchronization are provided. The method for application synchronization in a terminal includes receiving a first alarm registration request, determining whether a data transmission and reception action of an application corresponding to the first alarm registration request is detected within a preset time after a trigger time of the first alarm registration request, and estimating, when a data transmission and reception action of the application corresponding to the first alarm registration request is detected within the preset time after the trigger time of the first alarm registration request, the period of a repetitive synchronization activity associated with the first alarm registration request, and adjusting the execution time of the repetitive synchronization activity according to the period estimation result.

12 Claims, 24 Drawing Sheets

(56) References Cited

U.S. PATENT DOCUMENTS

| | | | | |
|---|---|---|---|---|
| 2002/0184288 A1* | 12/2002 | Vargas | G06F 1/3203 | 718/100 |
| 2002/0194192 A1* | 12/2002 | Dietz | G06Q 30/02 | |
| 2004/0028060 A1* | 2/2004 | Kang | H04W 40/248 | 370/400 |
| 2004/0179488 A1* | 9/2004 | Kim | H04J 3/0641 | 370/324 |
| 2005/0085279 A1* | 4/2005 | Aoki | H04W 52/0216 | 455/574 |
| 2007/0174685 A1* | 7/2007 | Banks | G06F 11/1658 | 714/12 |
| 2007/0230358 A1* | 10/2007 | Narayanan | H04L 12/5695 | 370/244 |
| 2009/0122782 A1* | 5/2009 | Horn | H04J 3/0679 | 370/350 |
| 2009/0219896 A1* | 9/2009 | Hakuli | H04W 36/10 | 370/335 |
| 2009/0291665 A1* | 11/2009 | Gaskarth | G06Q 30/04 | 455/405 |
| 2010/0023974 A1* | 1/2010 | Shiragaki | H04N 21/2402 | 725/58 |
| 2010/0299455 A1* | 11/2010 | Master | H04W 52/0216 | 709/248 |
| 2012/0203862 A1* | 8/2012 | Tayeb | G06F 8/61 | 709/217 |
| 2012/0214527 A1* | 8/2012 | Meylan | H04L 69/32 | 455/509 |
| 2012/0317638 A1* | 12/2012 | Carrara | G06F 21/44 | 726/17 |
| 2013/0054527 A1* | 2/2013 | Hwang | G06Q 30/06 | 707/634 |
| 2013/0055273 A1* | 2/2013 | Hong | H04L 67/325 | 718/102 |
| 2013/0086214 A1 | 4/2013 | Jung et al. | | |
| 2013/0138738 A1* | 5/2013 | Li | H04L 65/403 | 709/204 |
| 2013/0198374 A1* | 8/2013 | Zalmanovitch | H04W 24/02 | 709/224 |
| 2014/0074788 A1* | 3/2014 | Chatterjee | H04L 41/5041 | 707/639 |
| 2014/0199975 A1* | 7/2014 | Lou | H04W 4/001 | 455/414.1 |
| 2014/0208043 A1* | 7/2014 | Goddard | G06F 12/1491 | 711/152 |
| 2014/0380327 A1* | 12/2014 | Thabet | G06F 9/522 | 718/103 |
| 2016/0003931 A1* | 1/2016 | Ledingham | G01S 3/38 | 342/443 |

OTHER PUBLICATIONS

Merriam-Webster, "periodicity", 2016.*
Merriam-Webster, "white list", 2016.*
Wikia, "ignore list", 2016.*
Merriam-Webster, "estimate", 2017.*
Merriam-WEbster, "periodicity", 2017.*
Akyildiz et al., "Multimedia Group Synchronization Protocols for Integrated Services Networks", 1996.*
Lin et al., "Scheduling Periodic and Aperiodic Tasks in Hard Real-Time Computing Systems", 1991.*
Merriam-Webster, "interval", 2018.*
Merriam-Webster, "periodic", 2018.*
Tarvainen et al., "Estimation of Nonstationary EEG With Kalman Smoother Approach: An Application to Event-Related Synchronization (ERS)", 2004.*

* cited by examiner

TERMINAL AND APPLICATION SYNCHRONIZATION METHOD THEREFOR

CROSS-REFERENCE TO RELATED APPLICATION(S)

This application claims the benefit under 35 U.S.C. § 119(a) of a Korean patent application filed on Jun. 14, 2013 in the Korean Intellectual Property Office and assigned Serial number 10-2013-0068602, and of a Korean patent application filed on Apr. 3, 2014 in the Korean Intellectual Property Office and assigned Serial number 10-2014-0039814, the entire disclosure of each of which is hereby incorporated by reference.

TECHNICAL FIELD

The present disclosure relates to an application management method. More particularly, the present disclosure relates to application synchronization.

BACKGROUND

With advances in mobile communication technologies, terminals can support voice calls and also various data communication functions. In particular, thanks to development of advanced terminals such as smartphones and high-speed networks, users may send and receive a variety of data at anytime and anywhere. In a terminal such as a smartphone, various applications including a mail client, a Social Networking Service (SNS) client and an Instant Messaging (IM) client are executed. These applications may connect to networks and synchronize data between the applications and corresponding servers. To this end, the applications may be run according to their synchronization periods set based on user preferences. Synchronization periods are typically set to 5 minutes, 15 minutes, 30 minutes, 60 minutes and 4 hours, and may be set to other values according to user preferences. The user may set a short synchronization period for an application needing near real-time update. On the contrary, the user may set a long synchronization period for an application not needing near real-time update or to save communication and battery resources.

For each application with a set synchronization period, the terminal sends a request message for updated data to a counterpart, e.g. a server, on a network. In return, the counterpart sends requested data to the terminal.

To reduce power consumption, the terminal remains in power saving mode, such as idle mode, when communication is not needed. Whenever an application performs an update, the terminal transitions from idle mode to active mode. When multiple synchronization periods are set for a number of applications, the terminal may have to frequently transition from idle mode to active mode. Likewise, when two or more repetitive synchronization activities with different periods are set for one application, the same problem may arise.

FIG. 1 depicts a synchronization process according to the related art.

A mail client is registered with Account A, Account B and Account C. A repetitive synchronization activity with a period of 15 minutes is configured for each account. For Account A, the synchronization activity begins at 3600 seconds and ends at 3605 seconds. For Account A, an alarm is configured to trigger the synchronization activity 15 minutes after the previous ending thereof. Then, the synchronization activity for Account A is newly performed at 4505 seconds. Similar actions are performed for Account B and Account C.

The synchronization activity for Account B begins 8 seconds after the ending, at 3605 seconds, of the synchronization activity for Account A. Considering overall synchronization activities for one application, i.e. the mail client, idle times between synchronization activities are 8 seconds, 5 seconds, 14 minutes and 35 seconds, 10 seconds, 14 minutes and 33 seconds.

As described above, in the related art, when a mail client is registered with multiple accounts having different synchronization periods, synchronization is performed at different points in time for the individual accounts. Hence, in the view of one application, synchronization activities are performed in an irregular and aperiodic manner. Thereby, the terminal may have to transition from idle mode to active mode whenever a synchronization activity is performed. Frequent mode transitions may cause unnecessary signaling and power consumption. For example, in the case of a 3rd Generation (3G) Wideband Code Division Multiple Access (WCDMA) system, 35 control messages may be needed for switching to preservation mode and reconfiguration of Radio Access Bearers (RAB).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to perform application synchronization in an efficient manner.

Another aspect of the present disclosure is to perform application synchronization in a robust manner.

In accordance with an aspect of the present disclosure, a method for application synchronization in a terminal is provided. The method includes receiving a first alarm registration request, determining whether a data transmission and reception action of an application corresponding to the first alarm registration request is detected within a preset time after a trigger time of the first alarm registration request, and performing, when the data transmission and reception action of the application corresponding to the first alarm registration request is detected within the preset time after the trigger time of the first alarm registration request, adjustment by estimating the period of a repetitive synchronization activity associated with the first alarm registration request and adjusting an execution time of the repetitive synchronization activity according to the estimated period.

In accordance with another aspect of the present disclosure, a terminal supporting application synchronization is provided. The terminal includes a controller configured to receive a first alarm registration request, to determine whether a data transmission and reception action of an application corresponding to the first alarm registration request is detected within a preset time after a trigger time of the first alarm registration request, to perform, when a data transmission and reception action of the application corresponding to the first alarm registration request is detected within the preset time after the trigger time of the first alarm registration request, adjustment by estimating the period of a repetitive synchronization activity associated with the first alarm registration request, and to adjust the execution time of the repetitive synchronization activity according to the period estimation result, and a communication unit configured to send and receive data under control of the controller.

In accordance with another aspect of the present disclosure, a terminal supporting application synchronization is provided. The terminal includes a storage unit configured to store an ignore list, and a controller configured to determine whether an alarm trigger signal is generated, to determine, when an alarm trigger signal is generated, whether an alarm triggered by the alarm trigger signal is a target for application synchronization management, to determine, when the alarm is the target for application synchronization management, whether the alarm is a User Interface (UI) alarm or an abnormal action alarm, and to add, when the alarm is the UI alarm or the abnormal action alarm, information on the alarm to the ignore list.

In accordance with another aspect of the present disclosure, a method for application synchronization management is provided. The method includes determining whether an alarm trigger signal is generated, determining, when the alarm trigger signal is generated, whether an alarm triggered by the alarm trigger signal is a target for application synchronization management, determining, when the alarm is the target for application synchronization management, whether the alarm is a User Interface (UI) alarm or an abnormal action alarm, and adding, when the alarm is the UI alarm or the abnormal action alarm, information on the alarm to an ignore list.

In accordance with another aspect of the present disclosure, a method for application synchronization in a terminal. The method includes receiving a synchronization start notification for an application, the synchronization start notification including information on the application, obtaining status information of all synchronization activities of the application from the synchronization start notification, determining whether a record for a last synchronization time of a repetitive synchronization activity to be alarmed is present and storing the last synchronization time if the record for the last synchronization time of the repetitive synchronization activity to be alarmed is present, determining an estimated synchronization period on the basis of a generation time of the synchronization start notification and a last synchronization time of the repetitive synchronization activity and storing the estimated synchronization period, determining the next synchronization time using the estimated synchronization period, and storing the next synchronization time and the last synchronization time. Herein, the last synchronization time may be one of a point in time at which the corresponding synchronization start notification is generated, a point in time at which the repetitive synchronization activity is started, and a point in time at which the repetitive synchronization activity is ended. The synchronization start notification includes information on the start time of a corresponding synchronization activity and information on last synchronization times of other synchronization activities.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
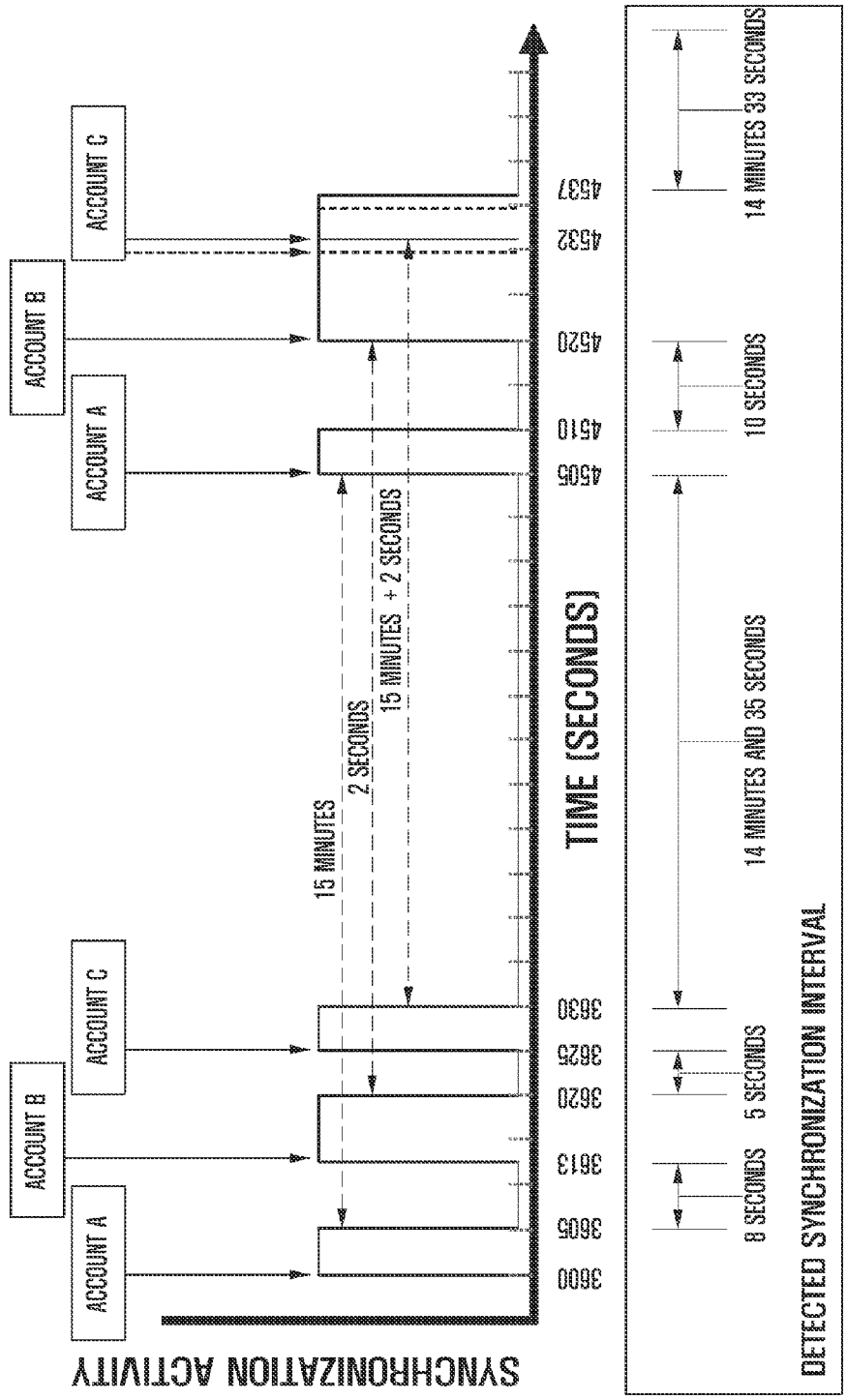
FIG. 1 depicts a synchronization process according to the related art.

In the present disclosure, a synchronization activity may be an instance of the synchronization activity. For example, in FIG. 1, one instance of the synchronization activity that begins at 3600 seconds and ends at 3605 seconds for Account A is a synchronization activity.

In the present disclosure, a repetitive synchronization activity indicates a set of instances of the same synchronization activity. For example, the synchronization activity for Account A is repeated every 15 minutes, and these instances of the synchronization activity are treated as one repetitive synchronization activity. Instances of the synchronization activity for Account A constitute one repetitive synchronization activity. Instances of the synchronization activity for Account B constitute another repetitive synchronization activity. Each repetitive synchronization activity has a unique identifier.

Figure 2:
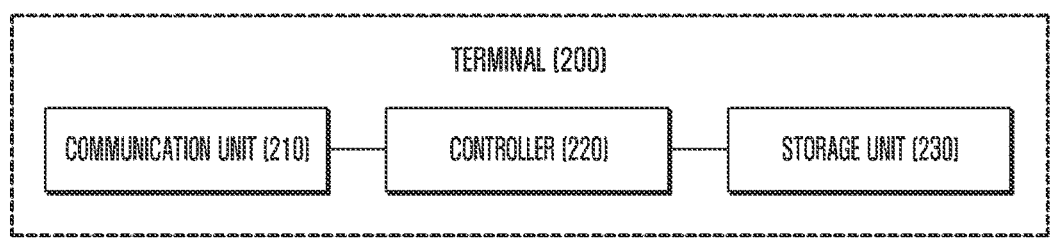
FIG. 2 is a block diagram of a terminal according to an embodiment of the present disclosure.

FIG. 2 is a block diagram of a terminal according to an embodiment of the present disclosure.

Referring to FIG. 2, a terminal 200 may include a communication unit 210, a controller 220, and a storage unit 230. The controller 220 controls the overall operation of the terminal 200 so that the terminal 200 operates according to an embodiment of the present disclosure. In particular, the controller 220 may estimate the period of each repetitive synchronization activity and adjust a start time of the synchronization activity accordingly. The controller 220 may store data needed for adjusting start times of synchronization activities in the storage unit 230. Under control of the controller 220, the communication unit 210 communicates with a server or counterpart entity on a network to send and receive data and signals needed for synchronization activities.

Although not shown in FIG. 2, the terminal 200 may further include an input unit to receive user key or touch input, and a display unit to display or provide information to the user.

The components shown in FIG. 2 are described in detail later with reference to FIGS. 3 to 19.

Figure 3:
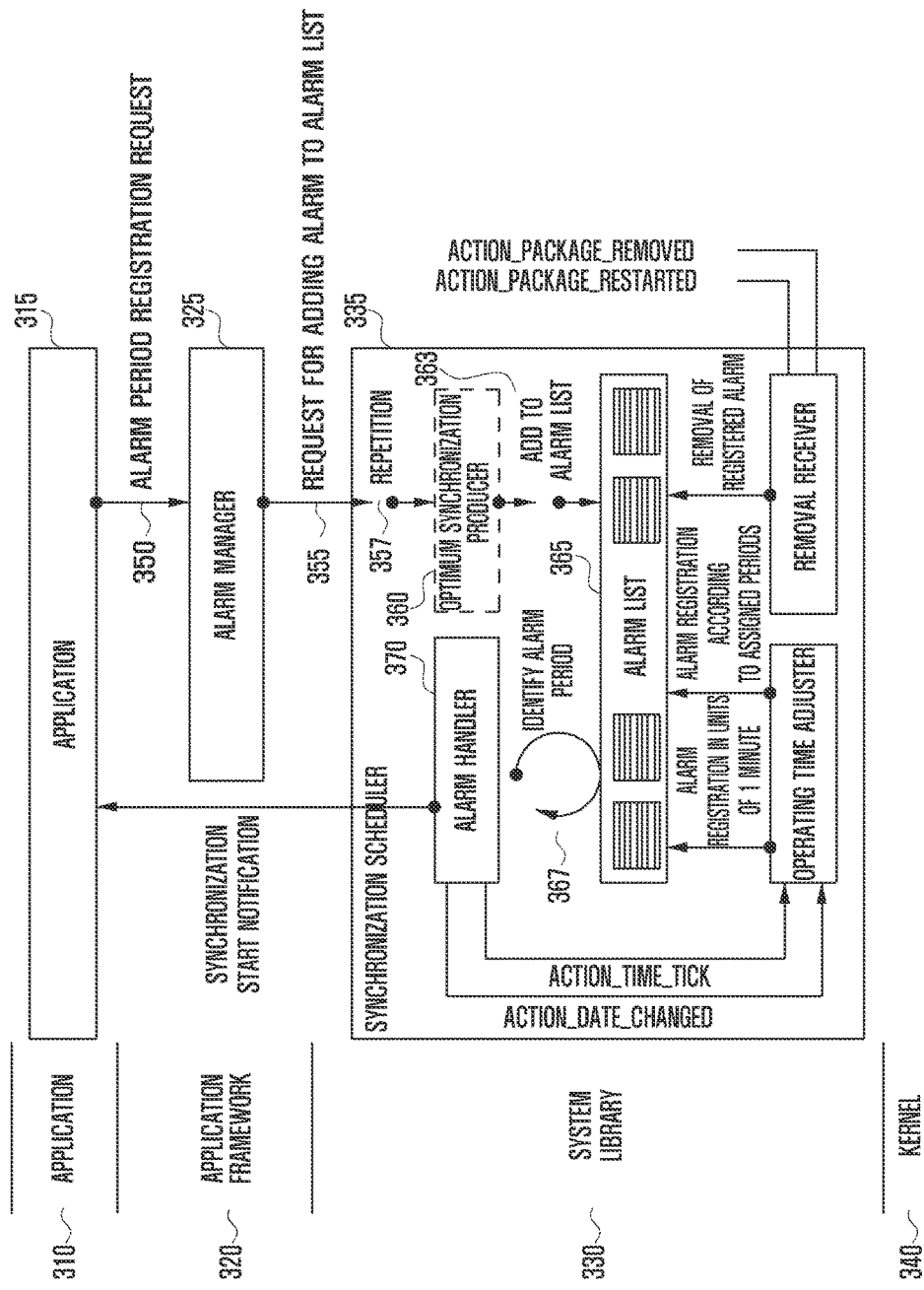
FIG. 3 illustrates a structure of an operating system for a controller according to a first embodiment of the present disclosure.

FIG. 3 illustrates a structure of an operating system for a controller according to a first embodiment of the present disclosure.

Referring to FIG. 3, the operating system for the controller 220 may include an application layer 310, an application framework layer 320, a system library layer 330, and a kernel layer 340.

The application layer 310 is a layer on which an application 315 resides. The application framework layer 320 is a set of classes and libraries implementing a standard structure for application programs in an operating system. The application framework layer 320 manages a lifecycle of the application 315 and provides event handling and application control functions. Here, the application framework layer 320 may include an alarm manager 325 to issue an update cycle synchronization request for the application 315.

The system library layer 330 is a set of data and files recoding portions of the operating system. Here, the system library layer 330 may include a synchronization scheduler 335 to synchronize synchronization periods of applications 315 running on the application layer 310.

The kernel layer 340 is the core of the operating system providing basic functions related to interrupt handling, process management, memory management, system management, and programming interfaces. Hence, the kernel layer 340 is loaded on a memory region protected from normal access. The kernel layer 340 may be regarded as a type of software controlling hardware.

The controller 220 having the above layers operates as follows.

At operation 350, for synchronization period registration as to the synchronization activity of the registered application 315, the application layer 310 sends a synchronization period registration request to the alarm manager 325 on the application framework layer 320. At operation 355, the alarm manager 325 makes a request to the synchronization scheduler 335 to add an alarm item to an alarm list 365. This process is repeated, whenever a synchronization activity is registered, in operation 357.

Thereafter, at operation 363, an optimum synchronization producer 360 identifies the synchronization period of a repetitive synchronization activity related to the requested synchronization activity and adds the identified synchronization period to the alarm list 365. At operation 367, the synchronization scheduler 335 examines repeat intervals on the alarm list 365 and the alarm handler 370 examines and/or identifies alarm periods to notify an alarm to the application layer 310. When an alarm period arrives, at operation 375, the synchronization scheduler 335 notifies the application layer 310 of an application synchronization alarm, or in other words, the synchronization scheduler 335 provides a synchronization start notification to the application layer 310.

The optimum synchronization producer 360 may adjust points in time to execute synchronization activities so that the synchronization activities are executed at the same time and/or in succession.

The optimum synchronization producer 360 may be an element belonging to the synchronization scheduler 335 or be a separate element not belonging to the synchronization scheduler 335.

Figure 4:
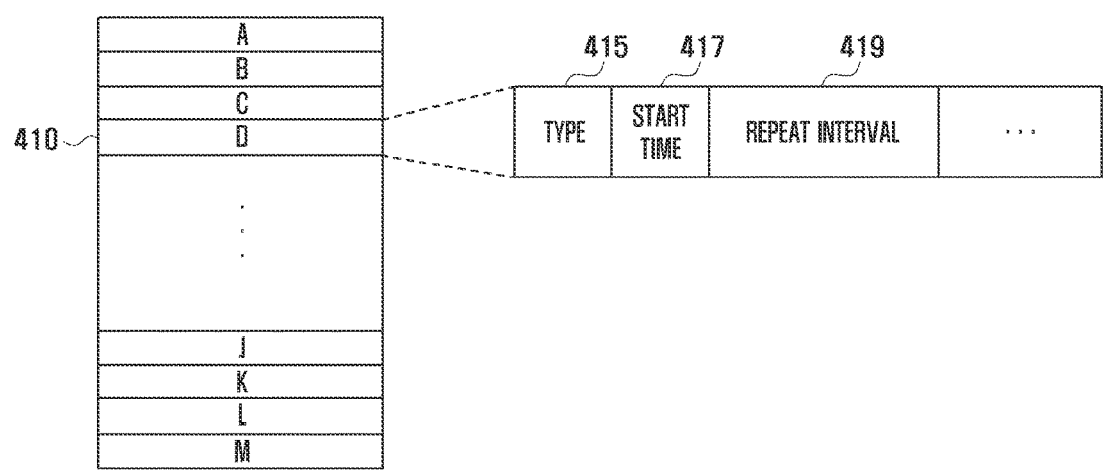
FIG. 4 illustrates formation of an alarm list according to an embodiment of the present disclosure.

FIG. 4 illustrates formation of an alarm list according to an embodiment of the present disclosure.

Referring to FIG. 4, the alarm list 365 stored in the storage unit 230 is composed of at least one record 410, each of which corresponds to a repetitive synchronization activity such that one of the records 410 is associated with one repetitive synchronization activity. Each record 410 may include a type field 415, a start time field 417 and a repeat interval field 419. Here, the type field 415 contains information indicating an alarm setting option to notify an update cycle, and indicates whether the corresponding alarm is set with respect to the absolute time, such as Universal Time Coordinated (UTC), or a relative time, such as 5 or 10 minutes from now. Representative examples for the type field 415 include ELAPSED_REALTIME_WAKEUP and RTC_WAKEUP. ELAPSED_REALTIME_WAKEUP indicates use of the terminal system time to trigger an alarm relative to the current time. RTC_WAKEUP indicates use of the network time to trigger an alarm with respect to the absolute time.

The start time field 417 indicates the point in time at which synchronization is performed first, after registration of the repetitive synchronization activity. The repeat interval field 419 indicates the period of the repetitive synchronization activity.

Each record 410 may include an identifier of the corresponding repetitive synchronization activity for activity identification. As described later, each record 410 may store the point in time at which the corresponding repetitive synchronization activity is performed last.

According to an embodiment, unlike the case of FIG. 4 wherein all fields for storing information on one repetitive synchronization activity are stored in a single record, some fields may be stored in another record. In this case, it is possible to obtain the same effect as the case of FIG. 4 by combining two records having the same repetitive synchronization activity identifier.

When an application 315 manages multiple repetitive synchronization activities, it sends an alarm registration request to the synchronization scheduler 335 for each repetitive synchronization activity as needed. The alarm registration request does not contain period information, and contains an identifier of a corresponding repetitive synchronization activity. Later, when an alarm time arrives, the synchronization scheduler 335 sends a synchronization start notification, which contains information illustrated in Table 1, to the application 315. The synchronization start notification may be referred to as an alarm notification.

TABLE 1

| Identifier of repetitive synchronization activity to be alarmed Synchronization status information | |
|---|---|
| First repetitive synchronization activity identifier | First last synchronization time |
| Second repetitive synchronization activity identifier | Second last synchronization time |
| Third repetitive synchronization activity identifier | Third last synchronization time |
| . . . | . . . |

Here, the identifier of a repetitive synchronization activity to be alarmed is the identifier of a repetitive synchronization activity whose synchronization time has arrived after registration. That is, when a notification according to Table 1 is received, the application 315 may perform a synchronization activity corresponding to the above identifier. For example, for a mail client application, the repetitive synchronization activity associated with a given account may be identified by a repetitive synchronization activity identifier. The repetitive synchronization activity associated with a different account will be identified by a different repetitive synchronization activity identifier.

The notification according to Table 1 contains information on the repetitive synchronization activity to be alarmed and other synchronization information. The notification according to Table 1 contains an identifier of a repetitive synchronization activity and the last synchronization time, i.e., a finish time, thereof. At the time of the first alarm registration request, an application other than the application 315 having registered the alarm may not refer to the information in Table 1, but rather, may refer to the information in Table 1 after being aware that an alarm notification is generated and is normally processed.

Figure 5:
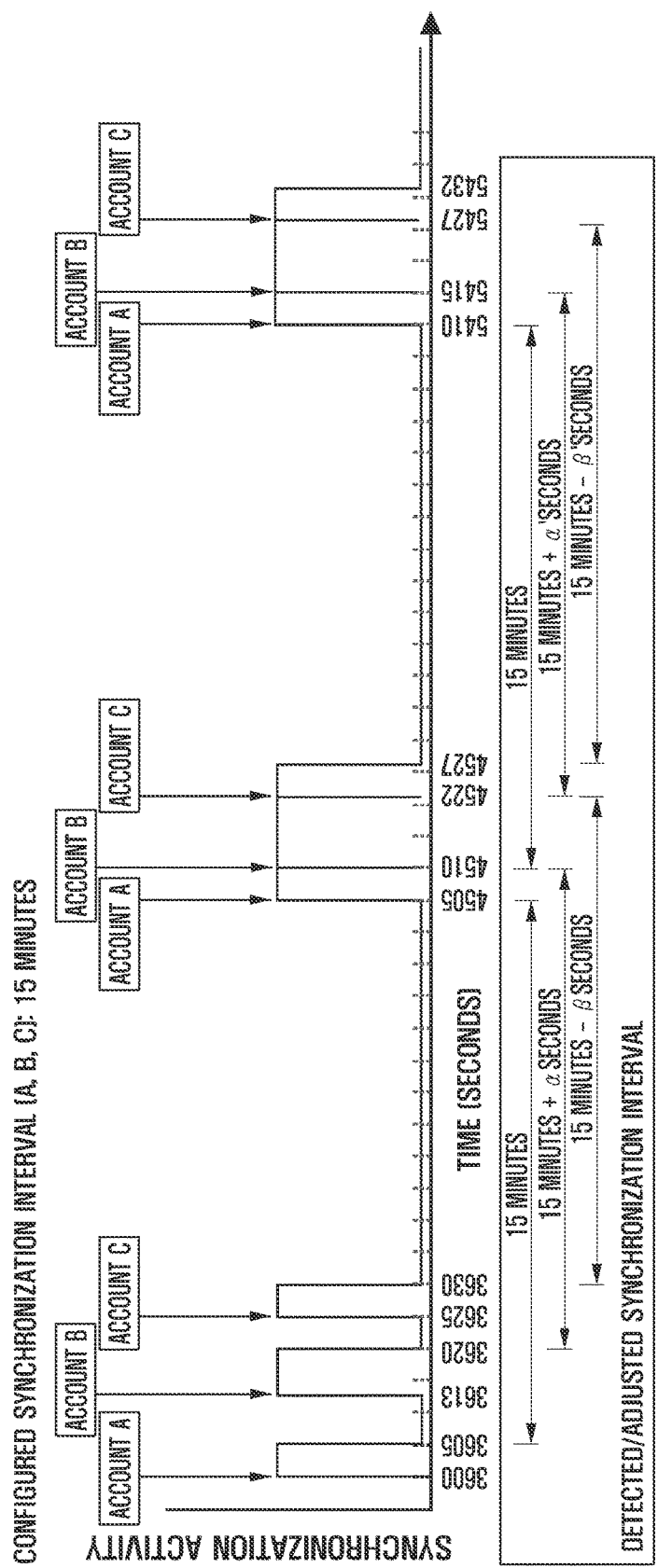
FIG. 5 depicts a synchronization process according to an embodiment of the present disclosure.

FIG. 5 depicts a synchronization process according to an embodiment of the present disclosure.

Referring to FIG. 5, the application 315 may be referred to as a mail client 315. The mail client 315 is registered with three accounts A, B and C. At the application level, each account is configured to be synchronized every 15 minutes. As described before, an alarm registration request sent by the application 315 to the synchronization scheduler 335 does not contain period information. Hence, it is necessary for the synchronization scheduler 335 or another entity to estimate the period of each repetitive synchronization activity. Estimation of the period of a synchronization activity is described later with reference to FIG. 6.

Figure 6:
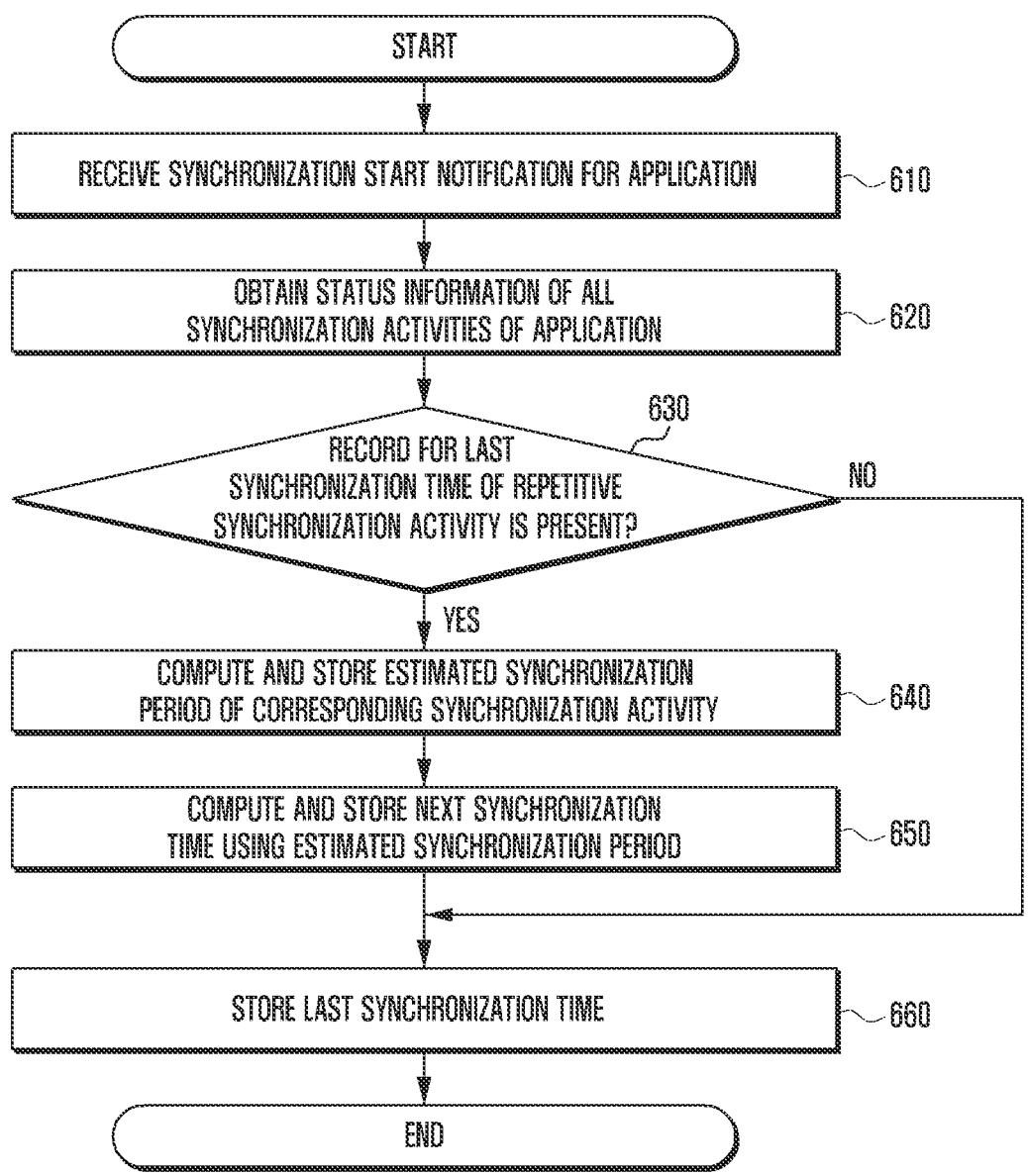
FIG. 6 is a flowchart of a procedure for synchronization period estimation according to an embodiment of the present disclosure.

FIG. 6 is a flowchart of a procedure for synchronization period estimation according to an embodiment of the present disclosure.

Referring to FIG. 6, at operation 610, the controller 220 receives a synchronization start notification, containing information similar to that of Table 1, for an application. As described before, the synchronization start notification has information on the start time of the corresponding synchronization activity and information on last synchronization times of other synchronization activities. For example, referring to FIG. 5, the synchronization activity for Account A begins at 3600 seconds and ends at 3605 seconds. Here, the controller 220 may receive a synchronization start notification at 3600 seconds, which is a start time of the synchronization activity for Account A. At operation 620, the controller 220 obtains status information of all the synchronization activities of the application from the synchronization start notification. For example, the controller 220 may obtain information on the last end times of the synchronization activities for Accounts A, B and C from the synchronization start notification.

At operation 630, the controller 220 examines and/or determines presence of a record for the last synchronization time of the repetitive synchronization activity to be alarmed. The controller 220 may identify the last synchronization time of the corresponding repetitive synchronization activity, e.g. for Account A, from the synchronization start notification according to Table 1. As another example, the controller 220 may have recorded the synchronization time at operation 660 and identify the last synchronization time for Account A using the recorded synchronization time. As another example, the controller 220 may identify the last synchronization time from the synchronization start notification, identify the last synchronization time having been recorded at operation 660, and select the later one of the two synchronization times. In the following description, it is assumed that the last synchronization time indicated by the synchronization start notification and the last synchronization time recorded at operation 660 both are used.

If the last synchronization time of the repetitive synchronization activity, for Account A, is not included in the synchronization start notification and the last synchronization time of the repetitive synchronization activity for Account A has not been recorded at operation 660, the controller 220 proceeds to operation 660 at which the controller 220 records the last synchronization time for Account A. Here, the last synchronization time may be one of a point in time at which the corresponding synchronization start notification is generated, a point in time at which the repetitive synchronization activity is started, and a point in time at which the repetitive synchronization activity is ended. To record the point in time at which the repetitive synchronization activity is ended, the controller 220 may wait for the synchronization activity to finish and then record the last synchronization time.

If the last synchronization time of the repetitive synchronization activity for Account A is determined to be present in and then obtained from the synchronization start notification or information recorded at operation 630, the controller 220 proceeds to operation 640.

At operation 640, the controller 220 computes an estimated synchronization period on the basis of the generation time of the synchronization start notification and the last synchronization time of the repetitive synchronization activity and stores the estimated synchronization period. For example, the estimated synchronization period may be computed by subtracting the last synchronization time of the repetitive synchronization activity from the generation time of the synchronization start notification. The estimated synchronization period may be stored in a corresponding record as illustrated in FIG. 4.

At operation 650, the controller 220 computes the next synchronization time using the estimated synchronization period and stores the same. For example, when the synchronization activity for Account A ends at 3605 seconds and the estimated synchronization period is 15 minutes, i.e., 900 seconds, the next synchronization time becomes 4505 seconds, which is the end time+the estimated synchronization period. The next synchronization time may be stored in a corresponding record as illustrated in FIG. 4. In a variant example, the next synchronization time may be computed by adding the start time and estimated synchronization period, which is the start time+the estimated synchronization period. Thereafter, operation 660 is performed as described before.

After the procedure of FIG. 6 is performed, the last synchronization time of the corresponding repetitive synchronization activity is stored. When the repetitive synchronization activity has been executed before, the estimated synchronization period and next synchronization time may also be obtained. In the embodiment of FIG. 5, the same process may be applied to the synchronization activity for Account B starting at 3613 seconds and the synchronization activity for Account C starting at 3625 seconds.

The embodiment of FIG. 6 illustrates a period estimation procedure, and may be replaced with a similar embodiment wherein two or more synchronization times are obtained and differences there-between are computed.

In the embodiment of FIG. 6, period estimation is performed using only the synchronization start notification. However, another embodiment considering not only the synchronization start notification but also network transmission status is described with reference to FIG. 8.

Figure 7:
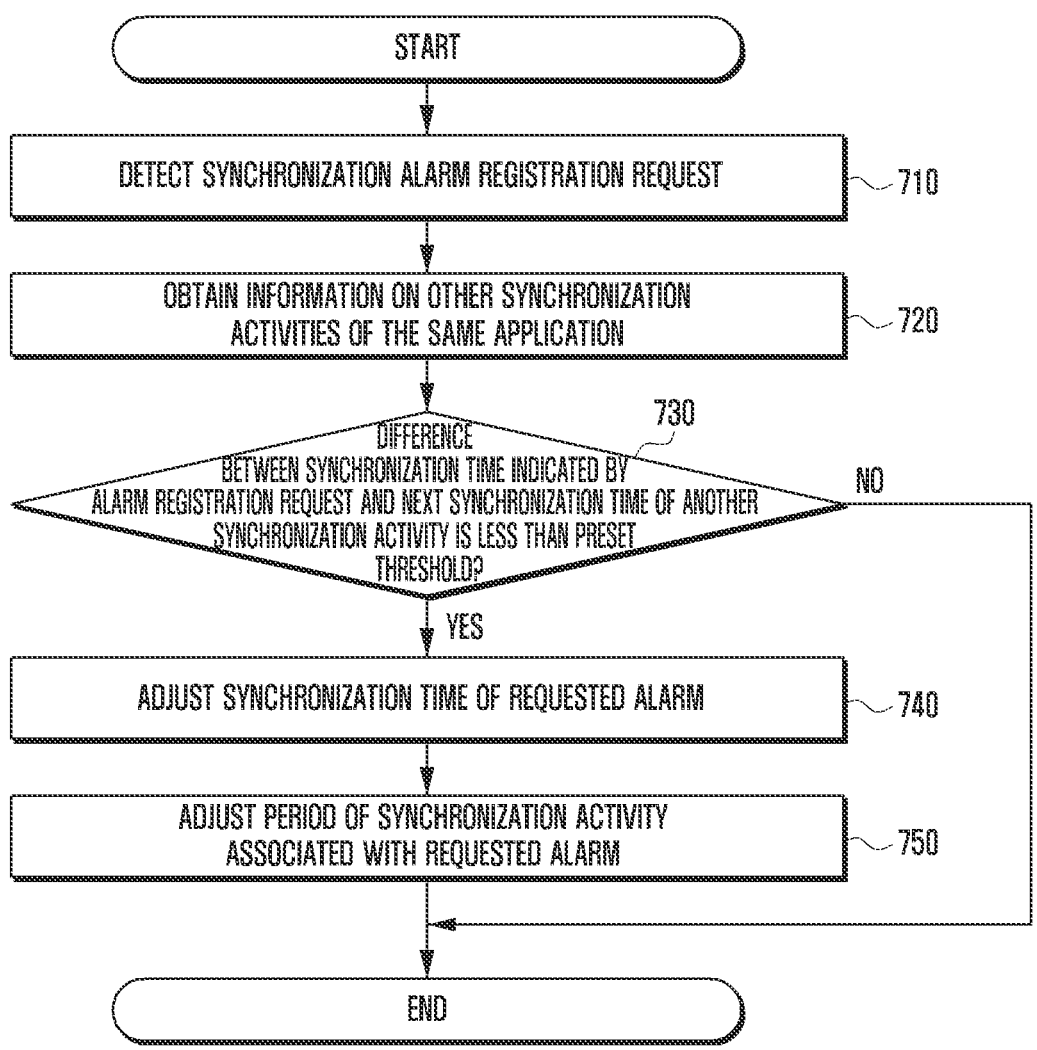
FIG. 7 is a flowchart of an alarm setting procedure according to an embodiment of the present disclosure.

FIG. 7 is a flowchart of an alarm setting procedure according to an embodiment of the present disclosure.

Referring to FIG. 7, at operation 710, the controller 220 detects an alarm registration request for synchronization issued by an application 315. As described before, the alarm registration request does not contain period information, and contains only an identifier of the repetitive synchronization activity and synchronization time. For example, after the synchronization activity for Account B ends at 3620 seconds, the application 315 may send an alarm registration request containing a synchronization time of 4520 seconds to the synchronization scheduler 335.

At operation 720, the controller 220 obtains information on other synchronization activities for the same application. For example, consider a case wherein an alarm registration request containing an identifier of the repetitive synchronization activity for Account B is detected. Here, the controller 220 obtains identifiers of the other repetitive synchronization activities of the application 315 and obtains next synchronization times of the other synchronization activities. For example, at the end time of the synchronization activity for Account B, the next synchronization time of the repetitive synchronization activity for Account A may be obtained. At the end time of the synchronization activity for Account C, the next synchronization time of the repetitive synchronization activity for Account A and the next synchronization time of the repetitive synchronization activity for Account B may be obtained.

At operation 730, the controller 220 determines whether the difference between the synchronization time indicated by the alarm registration request, e.g. 4520 seconds for Account B, and the next synchronization time of another synchronization activity, e.g. 4505 for Account A, is less than a preset threshold. For example, when the threshold is 20 seconds, as the difference between the two values, 15 seconds, is less than the threshold, the procedure proceeds to operation 740. Here, the comparison is made between repetitive synchronization activities for the same application. When the difference between the synchronization times is greater than the threshold, the requested alarm is registered without separate adjustment.

At operation 740, the controller 220 adjusts the synchronization time of the requested alarm. For example, the controller 220 may adjust the next alarm notification time for Account B so that it is equal to the next alarm notification time for Account A. When the two synchronization activities cannot be performed at the same time, the controller 220 may wait for the synchronization activity for Account A to finish, until 4510 seconds, and send an alarm notification for the synchronization activity for Account B to the application 315 after the synchronization activity for Account A is ended. The controller 220 may adjust the synchronization time of the synchronization activity for Account B so that the synchronization activity for Account B is executed in parallel with the synchronization activity for Account A or execution of the synchronization activity for Account B immediately follows execution of the synchronization activity for Account A with a preset time gap, using other similar ways.

At operation 750, the controller 220 adjusts the estimated synchronization period according to the result of operation 740, or in other words, adjusts a period of the synchronization activity associated with the requested alarm. For example, as the synchronization activity for Account B ends at 3620 seconds and the next synchronization activity is set to begin at 4505 seconds, the estimated synchronization period becomes 885 seconds, that is 15 minutes-15 seconds. When the next synchronization activity is set to begin at 4505 seconds, the estimated synchronization period becomes 890 seconds, that is 15 minutes-10 seconds. The adjusted estimated synchronization period may be stored in the storage unit 230 as a record illustrated in FIG. 4.

For the case described in FIG. 5, wherein one application performs several synchronization activities, the controller 220 may recognize that the synchronization period set for each synchronization activity is about 15 minutes through learning based on the procedure described in FIG. 6. The controller 220 may identify each synchronization activity according to computed synchronization periods, and may perform synchronization activities periodically according to set synchronization periods, within tolerances α, β, α', and β', by adjusting start times of the repetitive synchronization activities.

In the embodiment described in FIGS. 6 and 7, synchronization times and/or periods of multiple repetitive synchronization activities associated with the same application are adjusted. Adjustment of synchronization times of multiple repetitive synchronization activities associated with different applications may be performed in a similar manner. In this case, the scope of information collection for adjustment may be extended from repetitive synchronization activities for one application to all repetitive synchronization activities of different applications.

Figure 8:
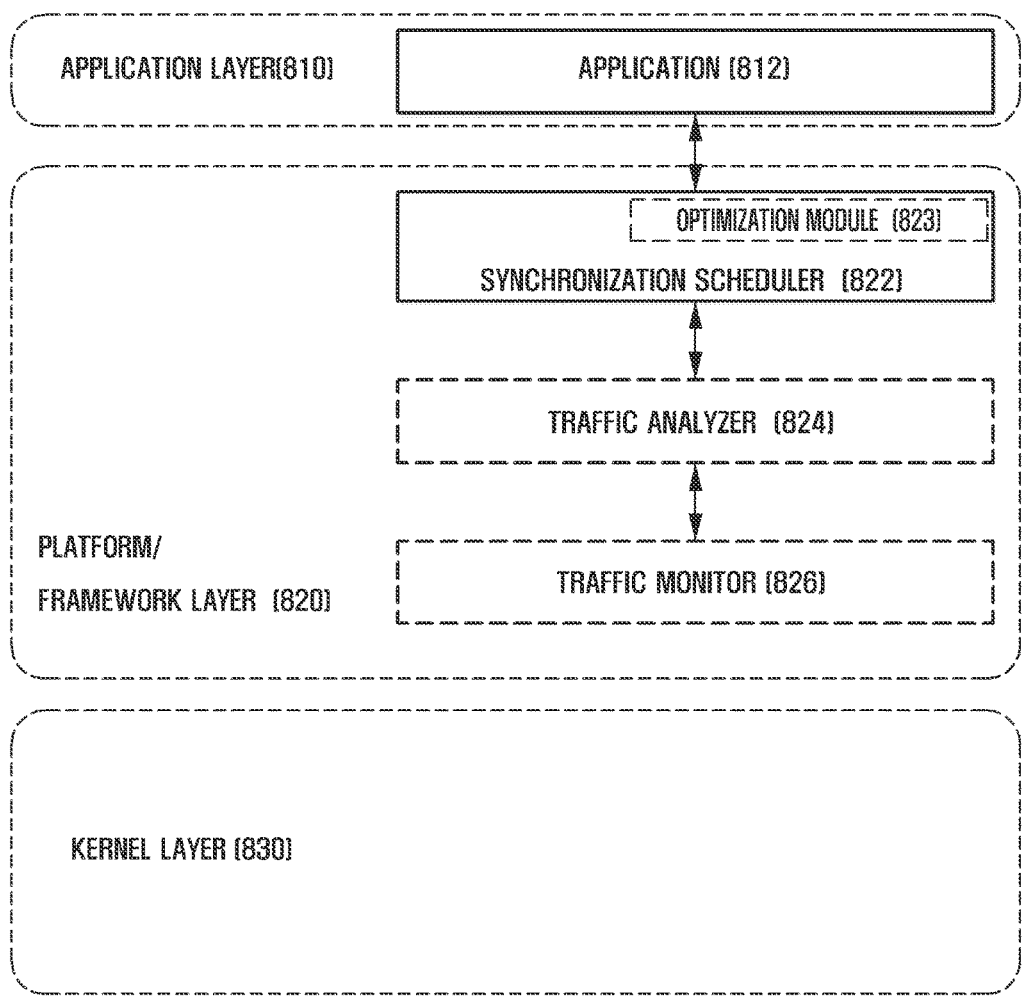
FIG. 8 illustrates a structure of an operating system for a terminal according to a second embodiment of the present disclosure.

FIG. 8 illustrates a structure of an operating system for a terminal according to a second embodiment of the present disclosure.

Referring to FIG. 8, the operating system for the terminal according to the second embodiment includes an application layer 810, a platform/framework layer 820 and a kernel layer 830.

The application layer 810 is a layer on which an application 812 resides. The platform/framework layer 820 is a set of classes and libraries implementing a standard structure for application programs in a given operating system. The platform/framework layer 820 manages the lifecycle of the application 812 and provides event handling and application control functions. The platform/framework layer 820 may include a synchronization scheduler 822, a traffic analyzer 824, and a traffic monitor 826. The traffic monitor 826 monitors operations related to synchronization traffic at a given time or according to a request from the traffic analyzer 824, and sends monitoring information to the traffic analyzer 824. The traffic analyzer 824 examines periodicity of traffic or synchronization activity on the basis of the monitoring information and provides periodicity information to the synchronization scheduler 822. The synchronization scheduler 822 may adjust synchronization times and/or periods of repetitive synchronization activities on the basis of traffic periodicity information and alarm registration information. The synchronization scheduler 822 may include an optimization module 823 to optimally configure synchronization times of repetitive synchronization activities.

The kernel layer 830 is the core of the operating system providing basic functions related to interrupt handling, process management, memory management, system management, and programming interfaces. Hence, the kernel layer 830 is loaded on a memory region protected from normal access. The kernel layer 830 may be regarded as a type of software controlling hardware.

According to an embodiment, the synchronization scheduler 822, traffic analyzer 824, and traffic monitor 826 all belong to the platform/framework layer 820. In this configuration, related entities belong to the same layer, making development and maintenance easier. In a variant embodiment, the traffic analyzer 824 may be included in the kernel layer 830, or the traffic analyzer 824 and traffic monitor 826 may be included in the kernel layer 830.

The synchronization scheduler 822, traffic analyzer 824, and traffic monitor 826 may be realized as separate entities. Alternatively, two of the synchronization scheduler 822, traffic analyzer 824, and traffic monitor 826 may be realized as one entity, and, for example, may be included on a single hardware unit, such as a processor and/or any other similar and/or suitable hardware unit. In the following description, it is assumed that the synchronization scheduler 822, traffic analyzer 824, and traffic monitor 826 are realized as separate entities. When two of the synchronization scheduler 822, traffic analyzer 824, and traffic monitor 826 are merged into one entity, signal or data transmission within the merged entity may be omitted.

Operations of the synchronization scheduler 822, traffic analyzer 824, and traffic monitor 826 are described in detail later with reference to FIGS. 9 to 19.

Figure 9:
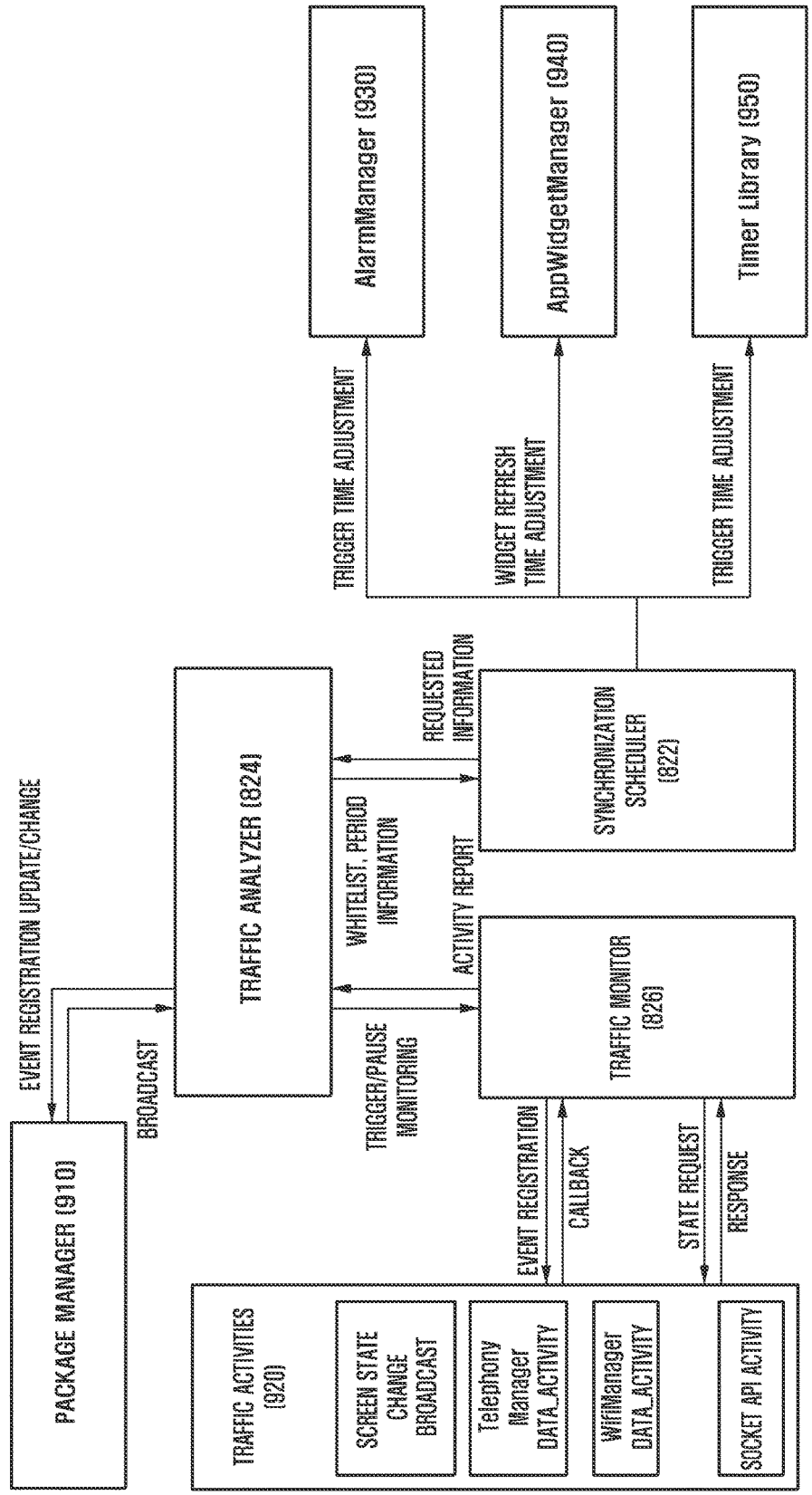
FIG. 9 illustrates terminal operations according to the second embodiment of the present disclosure.

FIG. 9 illustrates terminal operations according to the second embodiment of the present disclosure.

Referring to FIG. 9, the traffic monitor 826 monitors traffic activities 920. For example, the traffic monitor 826 may monitor on/off states of devices, such as screen on/off states. The traffic monitor 826 may monitor data activities of communication modules, such as a Wi-Fi module (not shown) and/or a Long Term Evolution (LTE) module (not shown), which may be included in the terminal. In particular, the traffic monitor 826 may monitor socket APIs called by applications and identify attempts for data transmission and reception.

In a variant embodiment, the traffic monitor 826 may monitor data transmission and reception by periodically obtaining statistical information on the network. As the latest Android operating system provides information on the amount of accumulated data sent and received by each application, it is possible to determine whether a particular application has sent or received data by monitoring a change in the accumulated data amount.

In a variant embodiment, the traffic monitor 826 may directly use a signal emitted by the communication module to determine whether a specific application has sent or received data. Direct use of a signal emitted by the communication module may require packet analysis to identify the corresponding application. However, as packet analysis is complex, it may be necessary to apply a simplified packet analysis scheme.

The traffic monitor 826 does not have to monitor data transmissions and receptions at all times. For example, when an alarm is registered, the traffic monitor 826 needs to perform monitoring for a preset time from the corresponding alarm time. This is because data transmission and reception occurring at other times is expected to be unrelated to a repetitive synchronization activity.

In a variant embodiment, the traffic monitor 826 may monitor data transmissions and receptions at all times. But, when an alarm is registered, the traffic monitor 826 may provide monitoring information to the traffic analyzer 824 or the synchronization scheduler 822 only when data transmissions and receptions are detected during a preset time from the corresponding alarm time.

In a variant embodiment, the traffic monitor 826 may monitor data transmissions and receptions at all times and may provide monitoring information to the traffic analyzer 824 or the synchronization scheduler 822 regardless of alarm registration. In this case, the traffic analyzer 824 or the synchronization scheduler 822 may identify a synchronization activity on the basis of information on the registered alarm times.

The traffic analyzer 824 identifies or examines periodicity of a synchronization activity. In the present disclosure, synchronization times of repetitive synchronization activities, being periodically executed, are normally adjusted. To this end, it is necessary to determine whether a repetitive synchronization activity is present. The traffic analyzer 824 performs such a function.

The traffic analyzer 824 may obtain information on alarms and/or timers registered by a specific application 812 from the synchronization scheduler 822. The traffic analyzer 824 may obtain information on data activities of a specific application, such as TCP/UDP session creation and/or data transmission, from the traffic monitor 826. The traffic analyzer 824 may determine whether data transmission or reception is caused by a specific alarm on the basis of information on alarms and/or timers and data activities. For example, when data transmission or reception is detected within a preset time after arrival of an alarm time, it may be determined that data transmission or reception is caused by the corresponding alarm.

The synchronization scheduler 822 adjusts synchronization times of repetitive synchronization activities as described in connection with FIGS. 3 to 7. Additionally, the synchronization scheduler 822 may use monitoring results of the traffic monitor 826 and analysis results of the traffic analyzer 824 in order to identify a repetitive synchronization activity corresponding to a given synchronization activity and the period of the repetitive synchronization activity. For example, the synchronization scheduler 822 may determine that a synchronization activity is performed only when data transmission or reception is detected within a preset time after arrival of an alarm time, and may ignore a case that data transmission or reception is not detected within a preset time after arrival of an alarm time.

The synchronization scheduler 822 may adjust alarm trigger times of an Alarm Manager 930, refresh times of an AppWidget Manager 940 or trigger times of a Timer Library 950 according to a procedure described below. A widget on the terminal may need synchronization when refreshed. Hence, refresh times of AppWidget Manager 940 are closely related with synchronization times.

Figure 10:
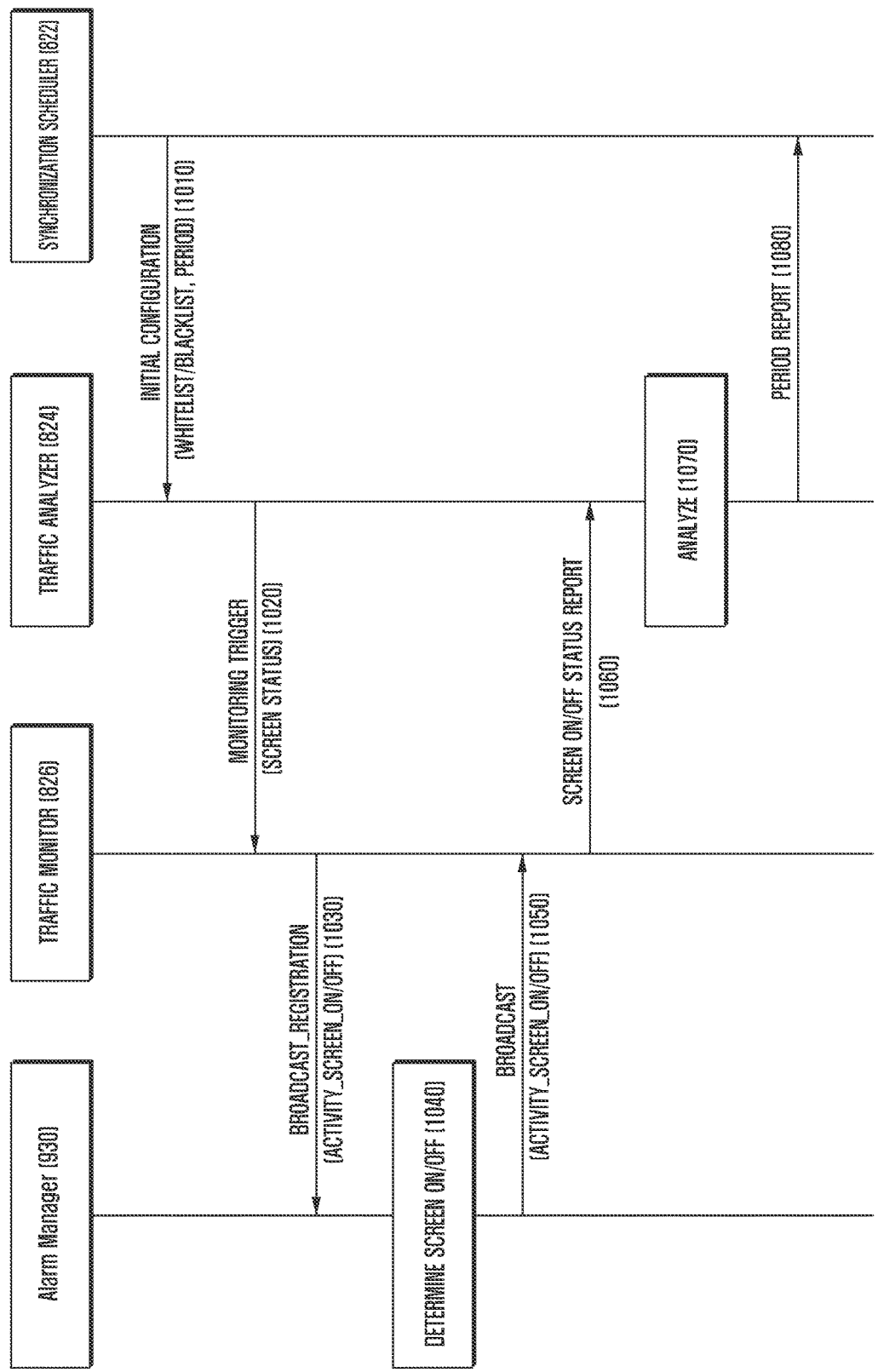
FIG. 10 is a sequence diagram illustrating a procedure for screen on/off state reporting according to the second embodiment of the present disclosure.

FIG. 10 is a sequence diagram illustrating a procedure for screen on/off state reporting according to the second embodiment of the present disclosure.

Referring to FIG. 10, at operation 1010, the synchronization scheduler 822 sends initial configuration information to the traffic analyzer 824. The initial configuration information may include at least a portion of whitelist information, blacklist information, and period information. Here, the whitelist is a list of applications or repetitive synchronization activities that are regarded as having periodicity and are targets for synchronization time adjustment. The blacklist is a list of applications or repetitive synchronization activities that are regarded as not having periodicity and are not a target for synchronization time adjustment. The period information may indicate a minimum time for determining periodicity. For example, when an activity is repeated at less than one minute intervals, the activity may be not regarded as a repetitive synchronization activity.

At operation 1020, the traffic analyzer 824 sends a direction message for triggering monitoring, or in other words, a monitoring trigger, to the traffic monitor 826. The direction message contains information on an event to be monitored. In FIG. 10, the direction message includes information for monitoring the screen on/off state.

At operation 1030, the traffic monitor 826 sends a broadcast registration message to the Alarm Manager 930 and/or the AppWidget Manager 940. The broadcast registration message includes a parameter indicating a broadcast request for screen state information.

It is not necessary to perform operations 1010 to 1030 for each monitoring action. It is sufficient to perform operations 1010 to 1030 once during initial monitoring configuration or monitoring reconfiguration. After monitoring configuration, the monitoring action may be repeated two or more times according to the configured settings.

At operation 1040, Alarm Manager 930 determines a screen on/off action. At operation 1050, Alarm Manager 930 broadcasts screen on/off state information. At operation 1060, the traffic monitor 826 receives the screen on/off state information and sends the same to the traffic analyzer 824.

At operation 1070, the traffic analyzer 824 analyzes periodicity of a synchronization activity using the screen on/off state information. For example, when data is sent and received while the screen is turned on, data transmission or reception may be regarded as being caused by user control and the corresponding activity may be not considered as a repetitive synchronization activity. On the contrary, when data is sent and received while the screen is turned off, data transmission or reception may be regarded as being caused by a synchronization activity and whether the synchronization activity is a repetitive synchronization activity may be determined in consideration of related other information.

At operation 1080, the traffic analyzer 824 sends obtained periodicity information to the synchronization scheduler 822.

Figure 11:
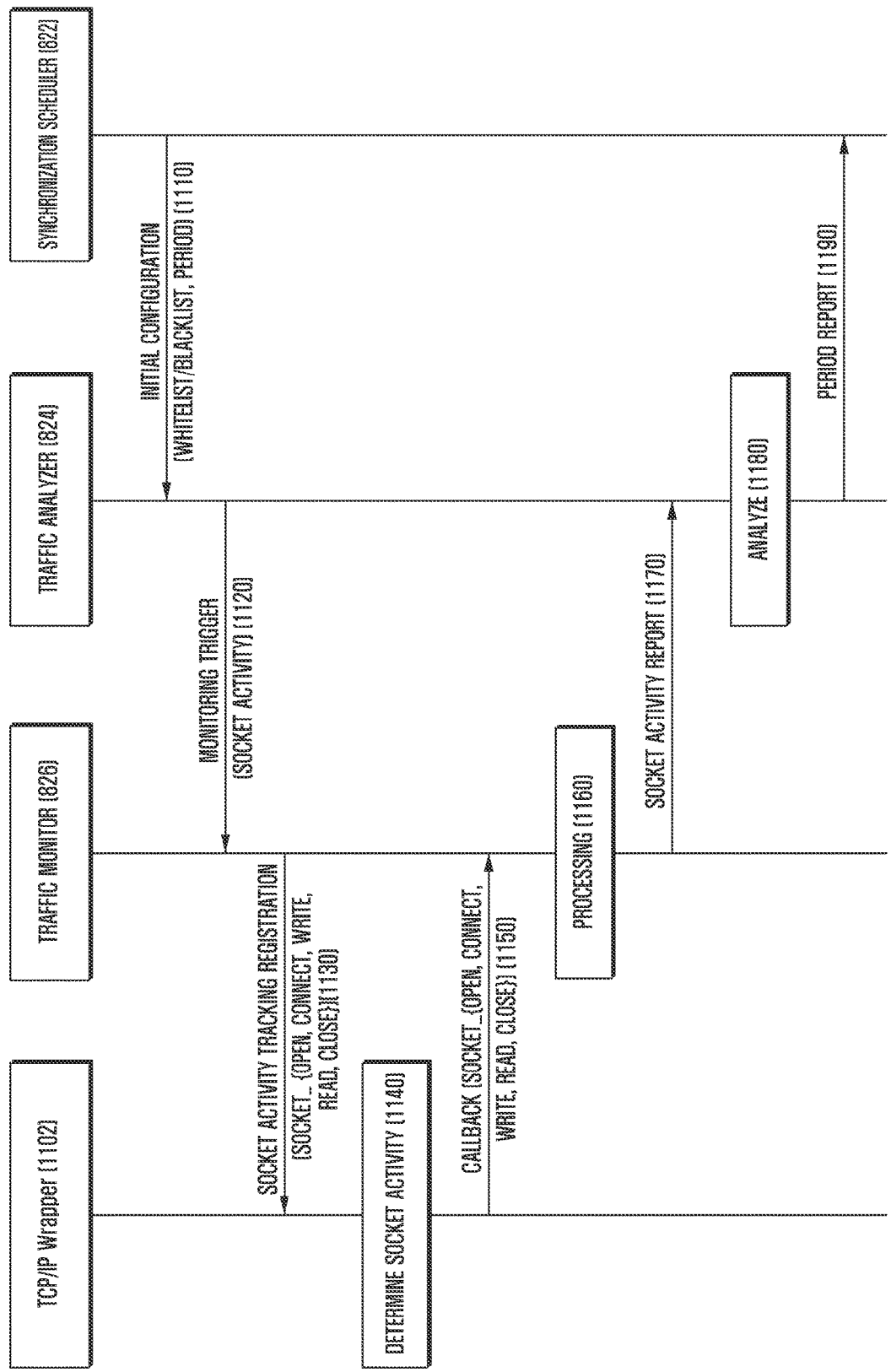
FIG. 11 is a sequence diagram illustrating a procedure for socket activity reporting according to the second embodiment of the present disclosure.

FIG. 11 is a sequence diagram illustrating a procedure for socket activity reporting according to the second embodiment of the present disclosure.

Referring to FIG. 11, at operation 1110, the synchronization scheduler 822 sends initial configuration information to the traffic analyzer 824. The initial configuration information may include at least a portion of whitelist information, blacklist information, and period information. Here, the whitelist is a list of applications or repetitive synchronization activities that are regarded as having periodicity and are targets for synchronization time adjustment. The blacklist is a list of applications or repetitive synchronization activities that are regarded as not having periodicity and are not a target for synchronization time adjustment. The period information may indicate a minimum time for determining periodicity. For example, when an activity is repeated at less than one minute intervals, the activity may be not regarded as a repetitive synchronization activity.

At operation 1120, the traffic analyzer 824 sends a direction message for triggering monitoring to the traffic monitor 826. The direction message contains information on an event to be monitored. In FIG. 11, the direction message includes information for monitoring socket activities.

At operation 1130, the traffic monitor 826 sends a socket activity tracking registration message to a TCP/IP Wrapper 1102. The TCP/IP Wrapper 1102 is a module managing communication system calls (such as socket write) from applications. The socket activity tracking registration message is a message requesting the TCP/IP Wrapper 1102 to make a callback upon detection of a socket activity. A socket activity may be a communication activity based on the socket such as socket Open, Connect, Write, Read and Close.

The socket activity tracking registration message may contain a parameter indicating an activity to be monitored and notified among all socket activities. For example, to monitor Connect and Write activities only, the traffic monitor 826 may send a socket activity tracking registration message containing a parameter indicating a broadcast request for information on Connect and Write activities.

It is not necessary to perform operations 1110 to 1130 for each monitoring action. It is sufficient to perform operations 1110 to 1130 once during initial monitoring configuration or monitoring reconfiguration. After monitoring configuration, the monitoring action may be repeated two or more times according to the configured settings.

At operation 1140, the TCP/IP Wrapper 1102 senses and/or determines a socket activity to be notified. At operation 1150, the TCP/IP Wrapper 1102 sends and/or performs a callback for information on the sensed socket activity to the traffic monitor 826. At operation 1160, the traffic monitor 826 processes the received information on socket activities.

At operation 1170, the traffic monitor 826 sends information and/or a report on socket activities to the traffic analyzer 824.

At operation 1180, the traffic analyzer 824 analyzes periodicity of a synchronization activity using the socket activity information. For example, when socket Write or Connect is invoked within a preset time after arrival of an alarm time, it can be regarded that data transmission is caused by a corresponding alarm.

At operation 1190, the traffic analyzer 824 sends obtained periodicity information, and/or a period report, to the synchronization scheduler 822.

Figure 12:
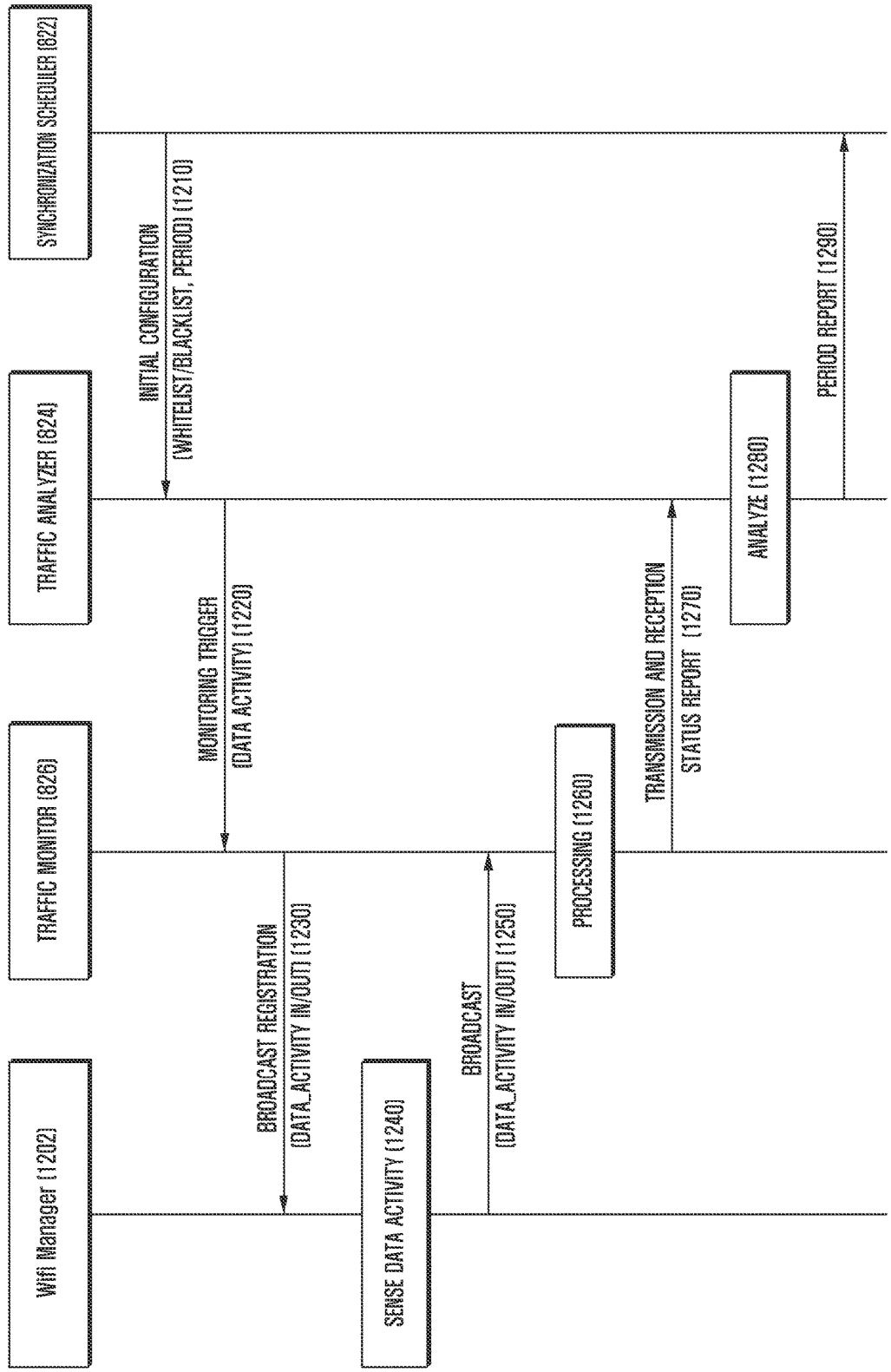
FIG. 12 is a sequence diagram illustrating a procedure for data activity reporting according to the second embodiment of the present disclosure.

FIG. 12 is a sequence diagram illustrating a procedure for data activity reporting according to the second embodiment of the present disclosure.

Referring to FIG. 12, at operation 1210, the synchronization scheduler 822 sends initial configuration information to the traffic analyzer 824. The initial configuration information may include at least a portion of whitelist information, blacklist information, and period information. Here, the whitelist is a list of applications or repetitive synchronization activities that are regarded as having periodicity and are targets for synchronization time adjustment. The blacklist is a list of applications or repetitive synchronization activities that are regarded as not having periodicity and are not a target for synchronization time adjustment. The period information may indicate a minimum time for determining periodicity. For example, when an activity is repeated at less than one minute intervals, the activity may be not regarded as a repetitive synchronization activity.

At operation 1220, the traffic analyzer 824 sends a direction message for triggering monitoring to the traffic monitor 826. The direction message contains information on an event to be monitored. In FIG. 12, the direction message includes information for monitoring data activities.

At operation 1230, the traffic monitor 826 sends a broadcast registration message to a Wi-Fi Manager 1202. Wi-Fi Manager 1202 is a communication agent relaying communication between an application and a communication hardware module. An LTE Manager (not shown) may be used instead of the Wi-Fi Manager 1202. As a Wi-Fi module and LTE module, or other cellular communication module, may be used together for data transmission and reception, both thereof may be a target for monitoring.

The broadcast registration message at operation 1230 is a message requesting the Wi-Fi Manager 1202 to broadcast an indication of a data activity upon detection of the data activity. Here, a data activity may be data transmission or reception through the Wi-Fi module.

It is not necessary to perform operations 1210 to 1230 for each monitoring action. It is sufficient to perform operations 1210 to 1230 once during initial monitoring configuration or monitoring reconfiguration. After monitoring configuration, the monitoring action may be repeated two or more times according to the configured settings.

At operation 1240, Wi-Fi Manager 1202 senses a data activity to be notified. At operation 1250, the Wi-Fi Manager 1202 sends information on the sensed data activity to the traffic monitor 826. At operation 1260, the traffic monitor 826 processes the received information on data activities.

At operation 1270, the traffic monitor 826 sends information on data activities, or in other words sends a transmission and reception status report, to the traffic analyzer 824.

At operation 1280, the traffic analyzer 824 analyzes periodicity of a synchronization activity using the data activity information. For example, when data is sent within a preset time after arrival of an alarm time, it can be regarded that data transmission is caused by a corresponding alarm.

At operation 1290, the traffic analyzer 824 sends obtained periodicity information, i.e., a period report, to the synchronization scheduler 822.

Figure 13:
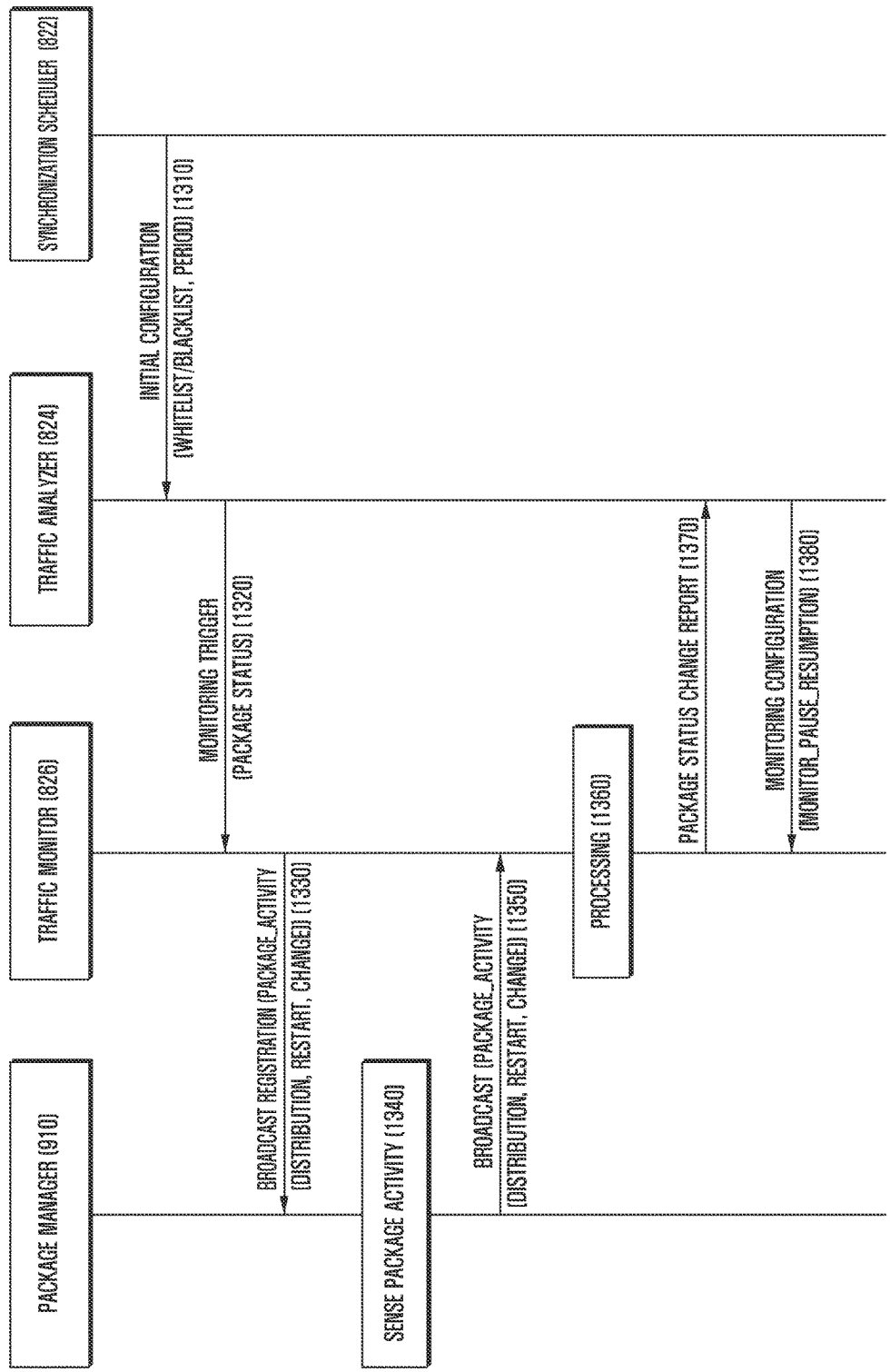
FIG. 13 is a sequence diagram illustrating a procedure for package activity reporting according to the second embodiment of the present disclosure.

FIG. 13 is a sequence diagram illustrating a procedure for package activity reporting according to the second embodiment of the present disclosure.

Referring to FIG. 13, at operation 1310, the synchronization scheduler 822 sends initial configuration information to the traffic analyzer 824. The initial configuration information may include at least a portion of whitelist information, blacklist information, and period information. Here, the whitelist is a list of applications or repetitive synchronization activities that are regarded as having periodicity and are targets for synchronization time adjustment. The blacklist is a list of applications or repetitive synchronization activities that are regarded as not having periodicity and are not a target for synchronization time adjustment. The period information may indicate a minimum time for determining periodicity. For example, when an activity is repeated at less than one minute intervals, the activity may be not regarded as a repetitive synchronization activity.

At operation 1320, the traffic analyzer 824 sends a direction message for triggering monitoring to the traffic monitor 826. The direction message contains information on an event to be monitored. In FIG. 13, the direction message includes information for monitoring package activities.

At operation 1330, the traffic monitor 826 sends a broadcast registration message to a Package Manager 910.

The broadcast registration message at operation 1330 is a message requesting Package Manager 910 to broadcast an indication of a package activity upon detection of the package activity. Here, a package activity may correspond to package distribution, restart or update. The broadcast registration message may contain a parameter indicating a package activity to be notified. Package Manager 910 is an entity managing package installation and the like.

It is not necessary to perform operations 1310 to 1330 for each monitoring action. It is sufficient to perform operations 1310 to 1330 once during initial monitoring configuration or monitoring reconfiguration. After monitoring configuration, the monitoring action may be repeated two or more times according to the configured settings.

At operation 1340, Package Manager 910 senses a package activity to be notified. At operation 1350, Package Manager 910 sends information on the sensed package activity to the traffic monitor 826. At operation 1360, the traffic monitor 826 processes the received information on package activities.

At operation 1370, the traffic monitor 826 sends information on package activities, i.e., a package status change report, to the traffic analyzer 824.

At operation 1380, the traffic analyzer 824 sends a monitoring configuration message to the traffic monitor 826 on the basis of the received package activity information. For example, when a specific package is distributed, restarted or updated, the monitoring configuration message may request initialization of all associated settings and resumption of monitoring.

Figure 14:
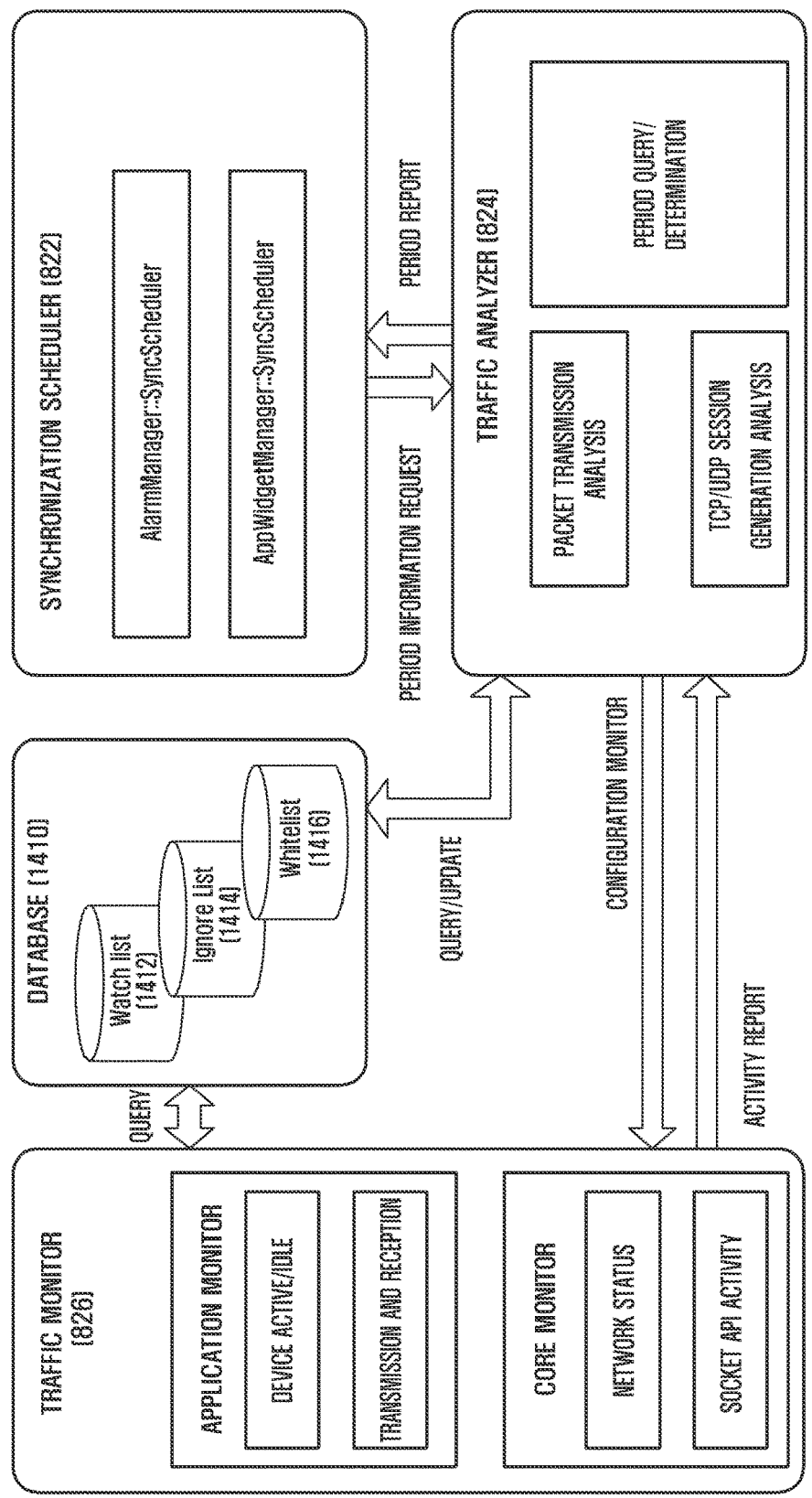
FIG. 14 illustrates a structure of an operating system for a terminal according to the second embodiment of the present disclosure.

FIG. 14 illustrates a structure of an operating system for a terminal according to a second embodiment of the present disclosure.

Referring to FIG. 14, the traffic monitor 826, the traffic analyzer 824, the synchronization scheduler 822 and a database 1410 are included. The database 1410 includes a watch list 1412, an ignore list 1414 and a whitelist 1416. The database 1410 is a type of a storage space, storage module or storage structure. The database 1410 may store necessary lists in the form of a regular file or the like.

The whitelist 1416 is a list of applications or repetitive synchronization activities that are determined as having periodicity. The watch list 1412 is a list of applications or repetitive synchronization activities that are not yet determined as having periodicity. The ignore list 1414 is a list of applications or repetitive synchronization activities that are determined as not having periodicity. Formation and update of the above lists are described later with reference to FIGS. 15 to 19.

The synchronization scheduler 822 may include an AlarmManager::SyncScheduler and an AppWidgetManager::SyncScheduler. Here, the AlarmManager::SyncScheduler is a synchronization scheduler for adjusting alarm trigger times. The App WidgetManager::SyncScheduler is a synchronization scheduler for adjusting widget refresh times.

Figure 15:
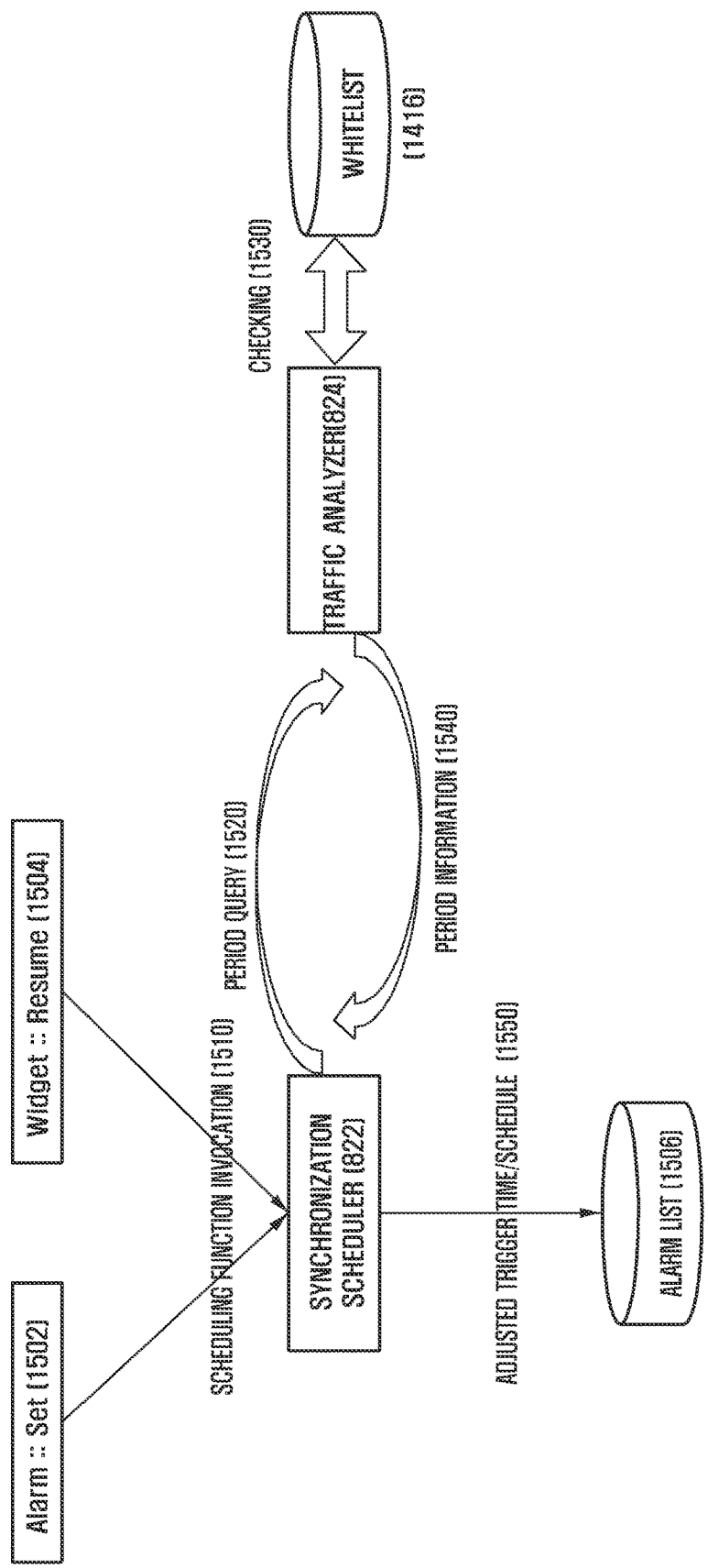
FIGS. 15 and 16 depict trigger time adjustment according to the second embodiment of the present disclosure.
Figure 16:
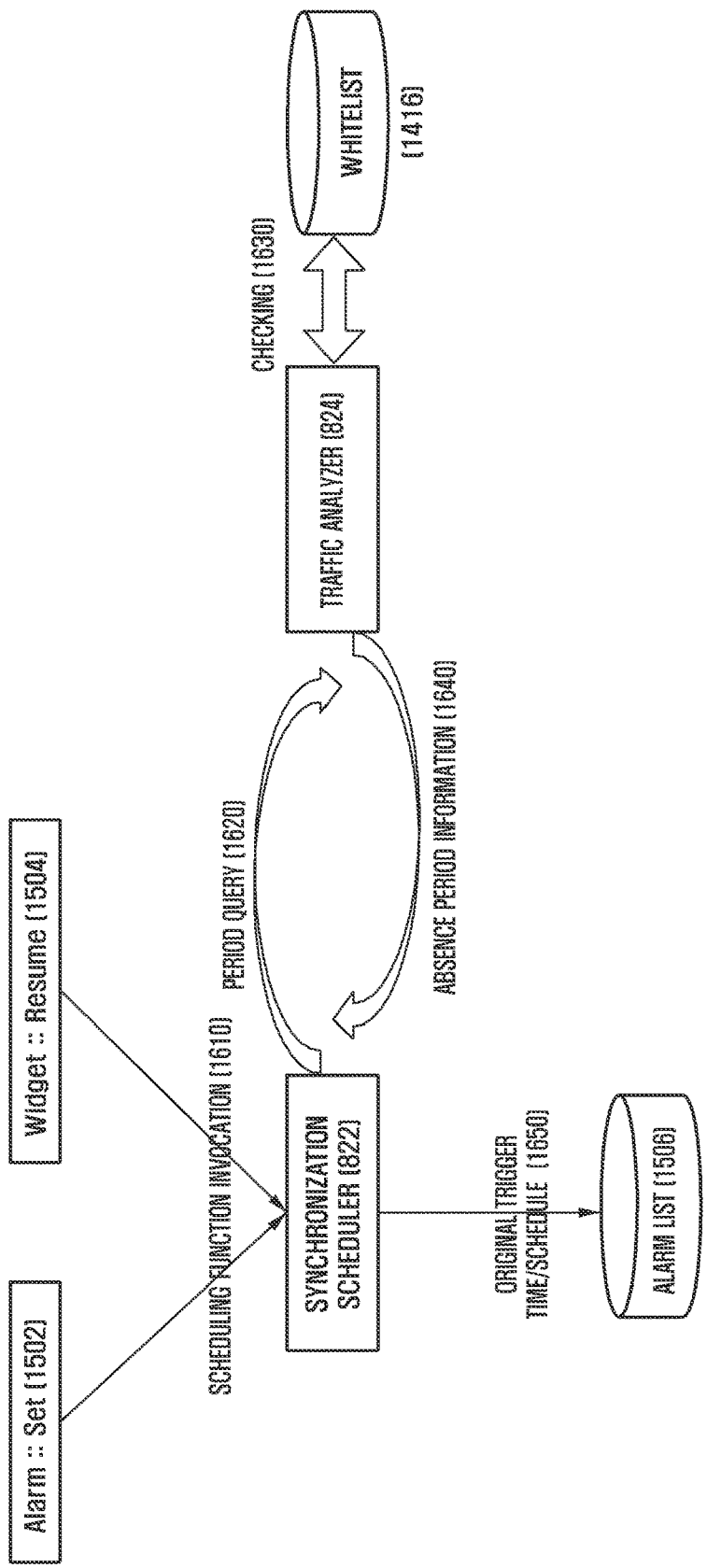

FIGS. 15 and 16 depict trigger time adjustment according to the second embodiment of the present disclosure. FIG. 15 illustrates a situation wherein the synchronization activity is already determined as having periodicity, and FIG. 16 illustrates a situation wherein the synchronization activity is not yet determined as having periodicity.

Referring to FIG. 15, at operation 1510, an Alarm::Set 1502 or a Widget::Resume 1504 calls a scheduling function using a scheduling request or an alarm registration request. The scheduling function called by the Alarm::Set 1502 or the Widget::Resume 1504 is to invoke a module managing alarm trigger/schedule, such as an alarm manager or widget manager, and the synchronization scheduler 822 may detect/identify an invocation to the scheduling function in the middle.

Upon detection of a call to the scheduling function, at operation 1520, the synchronization scheduler 822 sends a period query message for the corresponding application or synchronization activity to the traffic analyzer 824. To identify an application or synchronization activity, an application identifier or synchronization activity identifier may be utilized. According to the situations, an application identifier may be directly used as a synchronization activity identifier. Upon reception of the period query message, at operation 1530, the traffic analyzer 824 checks whether the application or synchronization activity corresponding to the call is on the whitelist 1416. In FIG. 15, it is assumed that the corresponding application or synchronization activity is on the whitelist 1416. At operation 1540, the traffic analyzer 824 sends period information corresponding to the call to the synchronization scheduler 822.

At operation 1550, the synchronization scheduler 822 adjusts the alarm trigger time and/or other scheduling time according to the received period information and records the adjusted alarm trigger time on the alarm list 1506. Adjustment of alarm trigger times is described in connection with FIG. 5.

Referring to FIG. 16, at operation 1610, an Alarm::Set 1502 or a Widget::Resume 1504 calls a scheduling function using a scheduling request or an alarm registration request. The scheduling function called by the Alarm::Set 1502 or the Widget::Resume 1504 is to invoke a module managing alarm trigger/schedule such as an alarm manager or widget manager, and the synchronization scheduler 822 may detect/identify an invocation to the scheduling function in the middle.

Upon detection of a call to the scheduling function, at operation 1620, the synchronization scheduler 822 sends a period query message for the corresponding application or synchronization activity to the traffic analyzer 824. To identify an application or synchronization activity, an application identifier or synchronization activity identifier may be utilized. Upon reception of the period query message, at operation 1630, the traffic analyzer 824 checks whether the application or synchronization activity corresponding to the call is on the whitelist 1416. In FIG. 16, it is assumed that the corresponding application or synchronization activity is not on the whitelist 1416. At operation 1640, the traffic analyzer 824 sends an indication indicating absence of period information corresponding to the call to the synchronization scheduler 822.

At operation 1650, the synchronization scheduler 822 records the original alarm trigger time and/or other scheduling time on the alarm list 1506 without adjustment.

Figure 17:
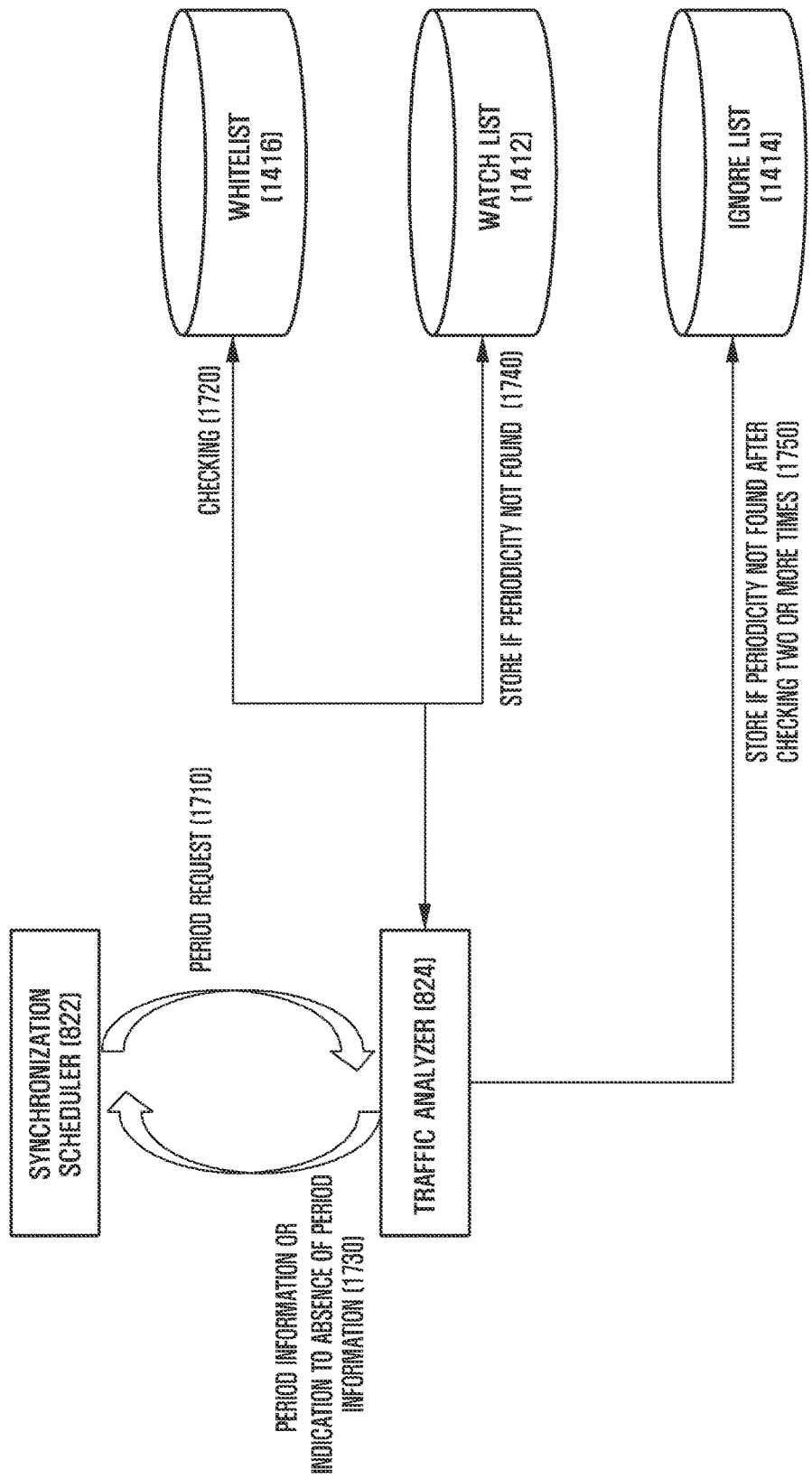
FIGS. 17 and 19 depict list management according to the second embodiment of the present disclosure.
Figure 19:
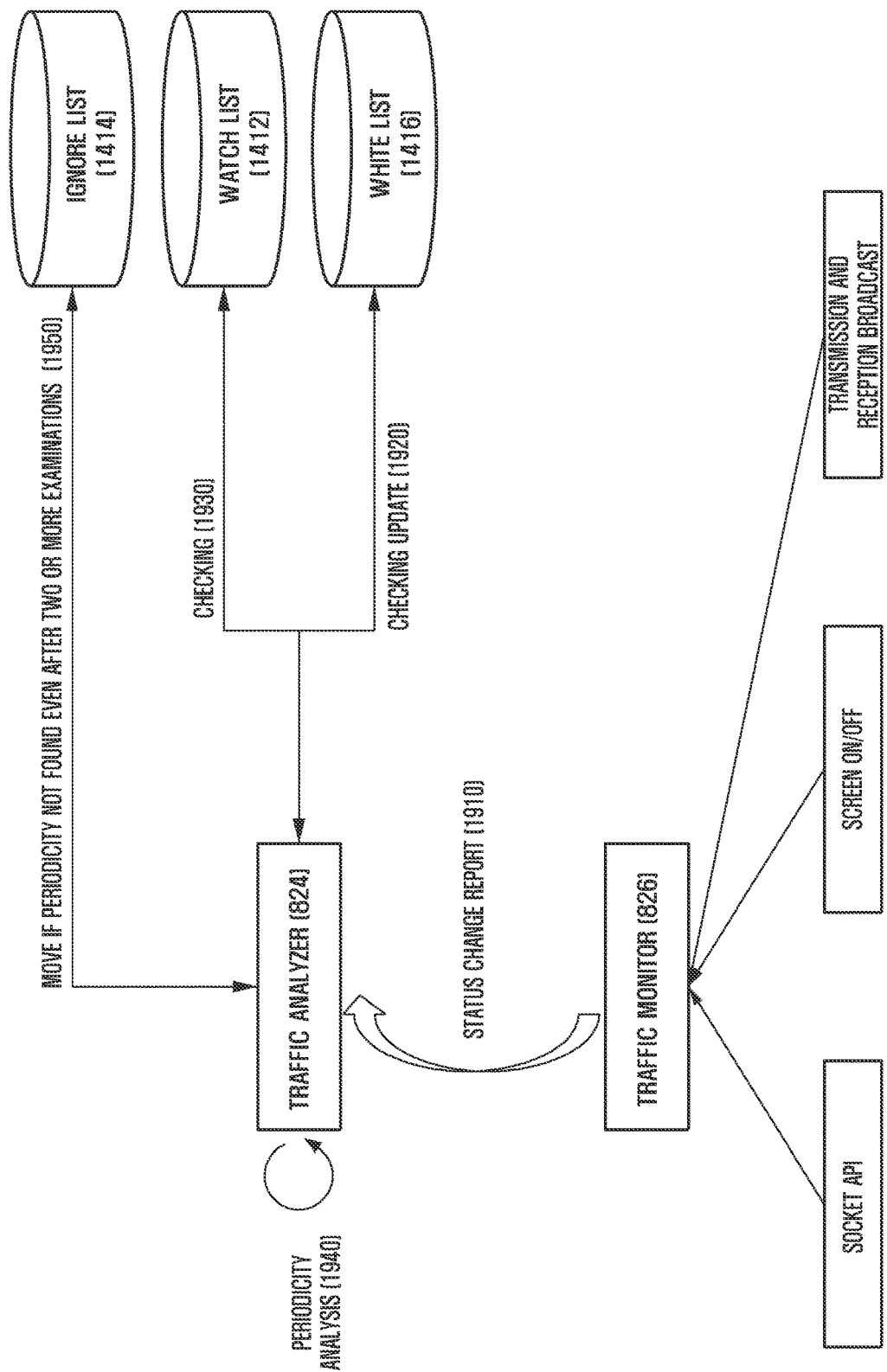

FIGS. 17 and 19 depict list management according to the second embodiment of the present disclosure according to an embodiment of the present disclosure.

Figure 18:
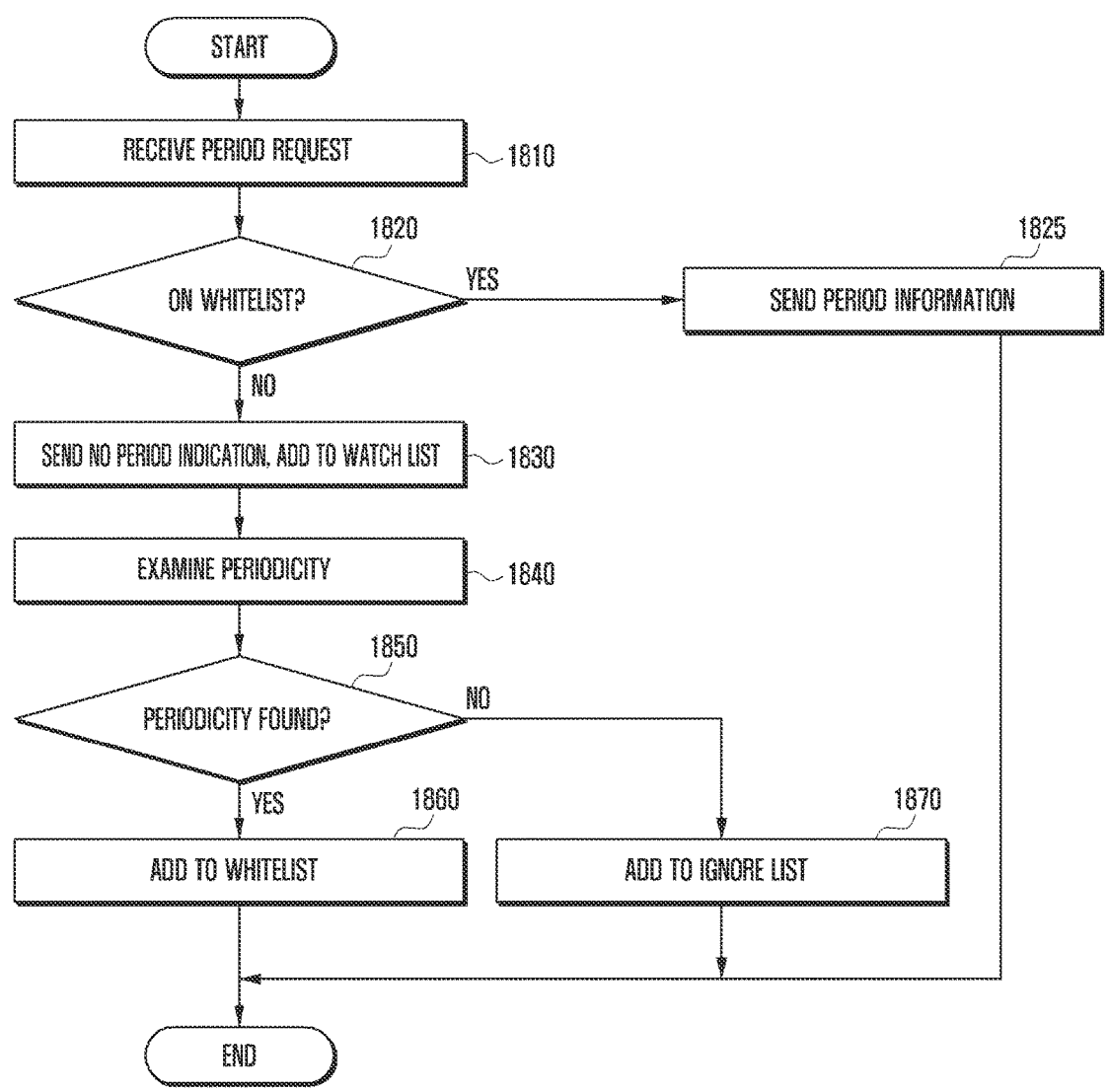
FIG. 18 is a flowchart of a procedure for list management according to the second embodiment of the present disclosure.

FIG. 18 is a flowchart of a procedure for list management according to the second embodiment of the present disclosure according to an embodiment of the present disclosure.

Referring to FIGS. 17, 18, and 19, they describe basically the same or similar schemes in different perspectives.

Referring to FIG. 17, at operation 1710, the synchronization scheduler 822 makes a request for period information in response to a scheduling request. At operation 1720, the traffic analyzer 824 checks whether an application or repetitive synchronization activity corresponding to the scheduling request is on the whitelist 1416. The whitelist 1416 stores applications or repetitive synchronization activities and their period information in an associated form.

At operation 1730, if an application or repetitive synchronization activity corresponding to the scheduling request is on the whitelist 1416, the traffic analyzer 824 sends period information associated with the application or repetitive synchronization activity to the synchronization scheduler 822, and if an application or repetitive synchronization activity corresponding to the scheduling request is not on the whitelist 1416, the traffic analyzer 824 sends an indication indicating absence of desired period information to the synchronization scheduler 822.

If an application or repetitive synchronization activity corresponding to the scheduling request is not on the whitelist 1416, at operation 1740, the traffic analyzer 824 adds and/or stores the identifier of the application or repetitive synchronization activity corresponding to the scheduling request and synchronization time thereof to the watch list 1412. Later, periodicity determination may be performed on the basis of information stored in the watch list 1412.

At operation 1750, if an application or repetitive synchronization activity corresponding to two or more scheduling requests is determined as not having periodicity, the traffic analyzer 824 adds the application or repetitive synchronization activity to the ignore list 1414, in other words, stores information on the application if the periodicity is not found after checking two or more times.

Referring to FIG. 18, at operation 1810, the traffic analyzer 824 receives a request message for period information of a specific application or synchronization activity from the synchronization scheduler 822. At operation 1820, the traffic analyzer 824 checks whether the application or synchronization activity is on the whitelist 1416. If the application or synchronization activity is on the whitelist 1416, the procedure proceeds to operation 1825 at which the traffic analyzer 824 sends period information of the application or synchronization activity to the synchronization scheduler 822.

If the application or synchronization activity is not on the whitelist 1416, the procedure proceeds to operation 1830.

At operation 1830, the traffic analyzer 824 sends an indication indicating absence of desired period information, i.e., that there is no period information, to the synchronization scheduler 822, and adds the identifier of the application or synchronization activity and synchronization time thereof to the watch list 1412.

Thereafter, at operation 1840, when two additional scheduling requests, for three scheduling requests in total, are issued for the same application or synchronization activity, the traffic analyzer 824 examines periodicity of the scheduling requests. For example, among start times of the three scheduling requests, when the interval between the start times of the first and second scheduling requests is equal to the interval between the start times of the second and third scheduling requests within a preset tolerance, it may be determined that periodicity is present. In this case, the period of the corresponding repetitive synchronization activity may be set to the average of the interval between the start times of the first and second scheduling requests and the interval between the start times of the second and third scheduling requests. The preset tolerance may be an absolute value set in advance, or be a value changeable according to the interval between the start times of the first and second scheduling requests and/or the interval between the start times of the second and third scheduling requests or other relationships.

At operation 1850, the traffic analyzer 824 checks whether periodicity is found. If periodicity is found, the procedure proceeds to operation 1860 at which the traffic analyzer 824 adds the identifier of the application or repetitive synchronization activity determined as having periodicity and period information thereof to the whitelist 1416 so that the application identifier is associated with the period information. If periodicity is not found, the procedure proceeds to operation 1870 at which the traffic analyzer 824 adds the identifier of the application or repetitive synchronization activity determined as not having periodicity to the ignore list 1414.

For an application or repetitive synchronization activity on the whitelist 1416, when scheduling requests do not match the period information recorded in the whitelist 1416, the traffic analyzer 824 may remove the application or repetitive synchronization activity from the whitelist 1416 and perform periodicity reexamination. When an application is newly installed or is changed in version, the traffic analyzer 824 may remove the application or repetitive synchronization activity from the whitelist 1416 and perform periodicity reexamination. In a variant embodiment, when the terminal is turned off and on again, an application or repetitive synchronization activity added to the whitelist 1416 through the procedure of FIG. 18 may be removed from the whitelist 1416 and re-examined for periodicity in a dynamic manner.

When an application is changed in version or updated, items related to the application are removed from the lists, i.e., the whitelist 1416, the watch list 1412 and the ignore list 1414. Thereafter, when a new alarm request and/or scheduling request is issued, periodicity may be reexamined.

Referring to FIG. 19, at operation 1910, the traffic monitor 826 sends the traffic analyzer 824 a state change report containing information on socket API activities, screen on/off state changes, and transmission and reception activities. Upon reception of the state change report, at operation 1920, the traffic analyzer 824 checks whether an application or synchronization activity associated with the state change is on the whitelist 1416. If an application or synchronization activity associated with the state change is on the whitelist 1416, the period information contained in items of the whitelist 1416 associated with the state change may be utilized.

If an application or synchronization activity associated with the state change is not on the whitelist 1416, at operation 1930, the traffic analyzer 824 refers to items of the watch list 1412 to check if the application or synchronization activity associated with the state change is on the watch list 1412. Using the items of the watch list 1412, at operation 1940, the traffic analyzer 824 examines periodicity of the application or synchronization activity. If periodicity is present, items related to the application or synchronization activity are added to the whitelist 1416. Otherwise, in operation 1950, items related to the application or synchronization activity are added to the ignore list 1414.

Figure 20:
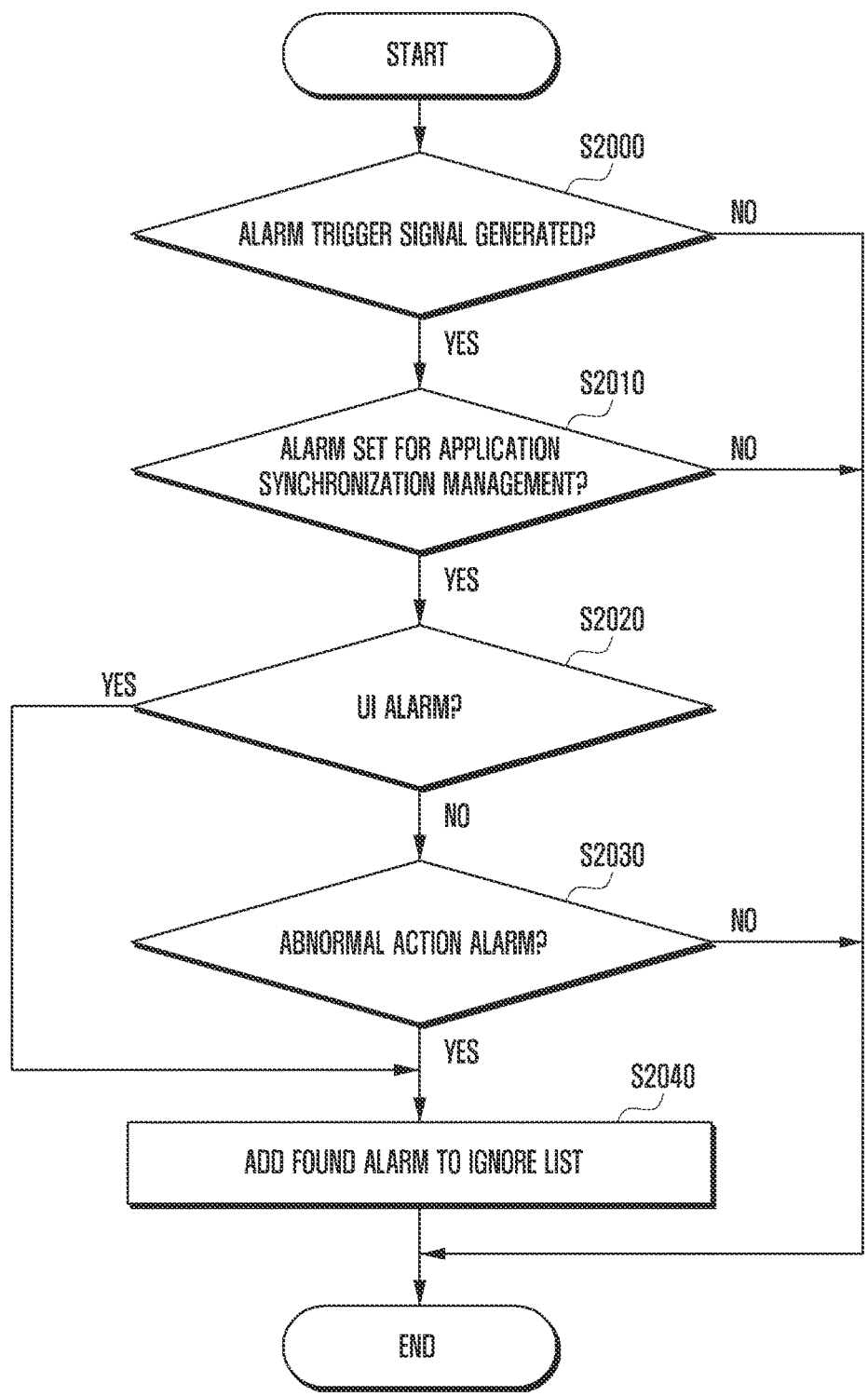
FIG. 20 illustrates a procedure for application synchronization management according to an embodiment of the present disclosure.

FIG. 20 illustrates a procedure for application synchronization management according to an embodiment of the present disclosure.

Referring to FIG. 20, at operation S2000, the controller 220 checks whether an alarm trigger signal is generated.

When an alarm trigger signal is generated, the procedure proceeds to operation S2010 at which the controller 220 checks whether the alarm triggered by the alarm trigger signal is an alarm set for application synchronization management. Here, for example, the alarm set for application synchronization management may be an alarm associated with a repetitive synchronization activity contained in the whitelist 1416. When a repetitive synchronization activity associated with the alarm triggered by the alarm trigger signal is on the whitelist 1416, the controller 220 determines that the alarm is an alarm set for application synchronization management.

As another example, the alarm set for application synchronization management may be an alarm associated with a repetitive synchronization activity contained in the watch list 1412. When a repetitive synchronization activity associated with the alarm triggered by the alarm trigger signal is on the watch list 1412, the controller 220 determines that the alarm is an alarm set for application synchronization management.

As another example, the alarm set for application synchronization management may be an alarm associated with a repetitive synchronization activity contained in at least one of the whitelist 1416 and the watch list 1412. When a repetitive synchronization activity associated with the alarm triggered by the alarm trigger signal is on at least one of the whitelist 1416 and the watch list 1412, the controller 220 determines that the alarm is an alarm set for application synchronization management.

Upon determining that the alarm is an alarm set for application synchronization management, the procedure proceeds to operation S2020 at which the controller 220 checks whether the alarm is a User Interface (UI) alarm. Here, the UI alarm is an alarm involving a UI action and includes a UI action alarm. When a UI action alarm is triggered, foreground processing is needed and the screen is to be turned on.

If the alarm is a UI alarm, the procedure proceeds to operation S2040 at which the controller 220 adds information on the repetitive synchronization activity associated with the alarm to the ignore list 1414. When the alarm is a UI alarm, the controller 220 does not apply application synchronization management to the repetitive synchronization activity associated with the alarm. An alarm for such a repetitive synchronization activity is registered according to the time requested by the application without timing adjustment.

If the alarm is not a UI alarm, the procedure proceeds to operation S2030 at which the controller 220 checks whether the alarm is an abnormal action alarm.

If the alarm is an abnormal action alarm, the procedure proceeds to operation S2040 at which the controller 220 adds information on the repetitive synchronization activity associated with the alarm to the ignore list 1414.

According to an embodiment, when the alarm is an alarm set for application synchronization management, operation S2030 may be performed; when the alarm is an abnormal action alarm, operation S2040 may be performed; when the alarm is not an abnormal action alarm, operation S2020 may be performed; and when the alarm is a UI alarm, operation S2040 may be performed.

According to an embodiment, among operations S2000 to S2040 in the procedure of FIG. 20, operation S2020 may be skipped.

According to an embodiment, among operations S2000 to S2040 in the procedure of FIG. 20, operation S2030 may be skipped.

Figure 21:
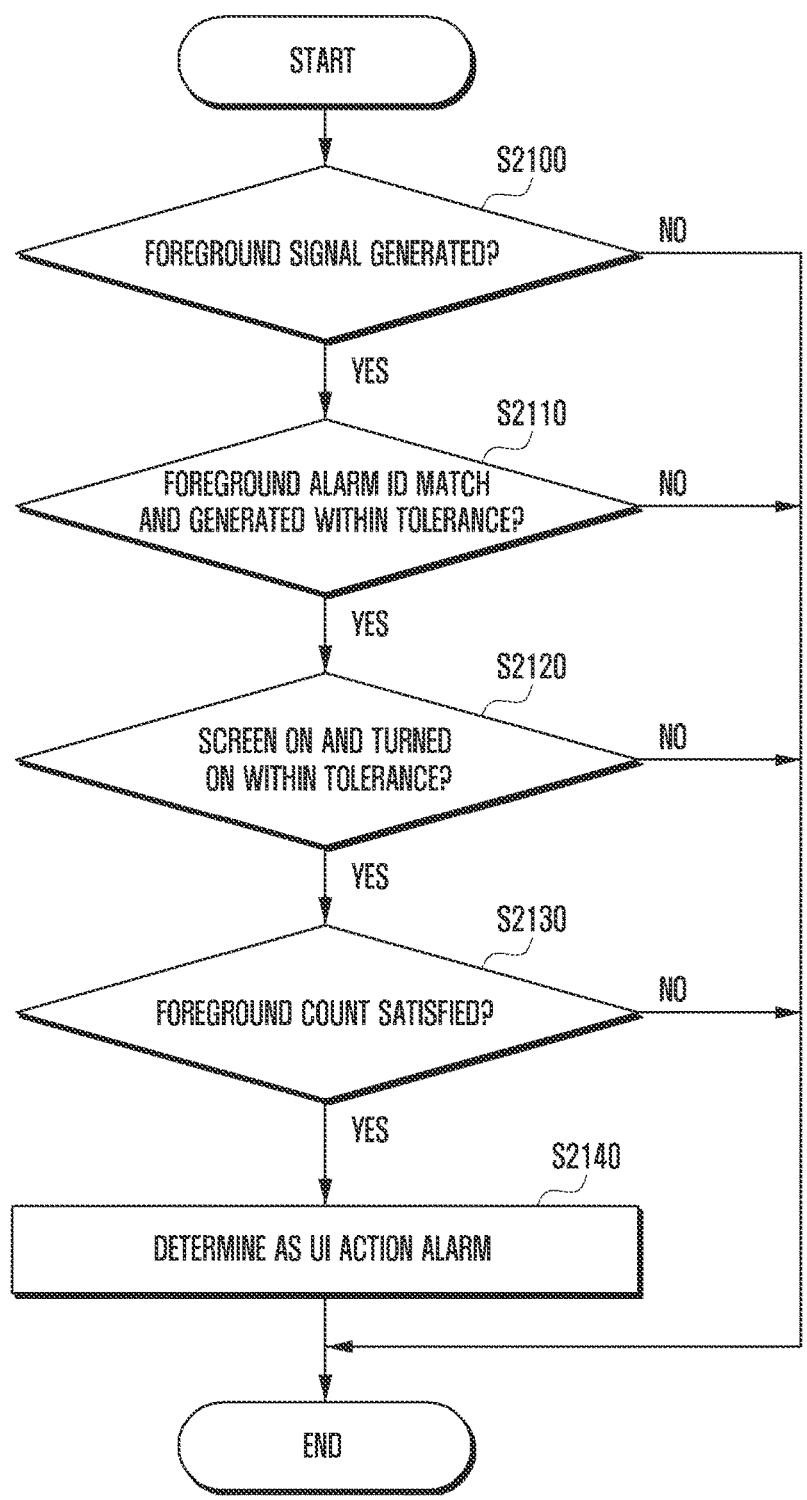
FIG. 21 illustrates a procedure for alarm identification according to an embodiment of the present disclosure.

FIG. 21 illustrates a procedure for alarm identification according to an embodiment of the present disclosure.

Referring to FIGS. 20 and 21, operation S2020 of FIG. 20 may include operations S2100 to S2140 of FIG. 21.

Referring to FIG. 21, at operation S2100, the controller 220 checks whether a foreground signal is generated.

When a foreground signal is generated, the procedure proceeds to operation S2110 at which the controller 220 checks whether the ID of an alarm to be identified is equal to the ID of the alarm having caused foreground processing and whether the foreground signal is generated within a tolerance time. The tolerance time may be set in advance and be updated on the basis of generation of the foreground signal after the alarm trigger signal. For example, the tolerance time may be set to 10 seconds.

When the IDs match and the foreground signal is generated within a tolerance time, the procedure proceeds to operation S2120 at which the controller 220 checks whether the screen is on and is turned on within the tolerance time.

When the screen is turned on within the tolerance time, the procedure proceeds to operation S2130 at which the controller 220 checks whether a foreground count of a repetitive synchronization activity associated with the alarm to be identified satisfies a preset count.

As an example, the preset count may be two times. UI action alarms may include a single alarm and multiple alarms. Whenever a UI action alarm is triggered, UI control is to be performed. This is recorded, and when a UI action alarm is triggered two or more times, it is added to the ignore list 1414.

For multiple alarms, it is needed to consider two cases: alarm periods associated with one application are the same, and alarm periods are different. In the event that the alarm periods are the same or a common multiple of the period of a UI alarm, a UI change occurs whenever an alarm is triggered. As it is difficult to distinguish a UI alarm among the alarms, all the alarms are added to the ignore list 1414.

In the event that the alarm periods are different from each other, it is possible to identify characteristics of each alarm. Hence, among multiple alarms, a UI action alarm having triggered two or more times is added to the ignore list 1414, and other ordinary alarms may be added to the ignore list 1414 or the whitelist 1416 according to synchronization rules of the application.

When the foreground count satisfies the preset count, the procedure proceeds to operation S2140 at which the controller 220 determines that the alarm to be identified is a UI action alarm. The controller 220 may add information on the repetitive synchronization activity associated with the alarm to the ignore list 1414.

Figure 22:
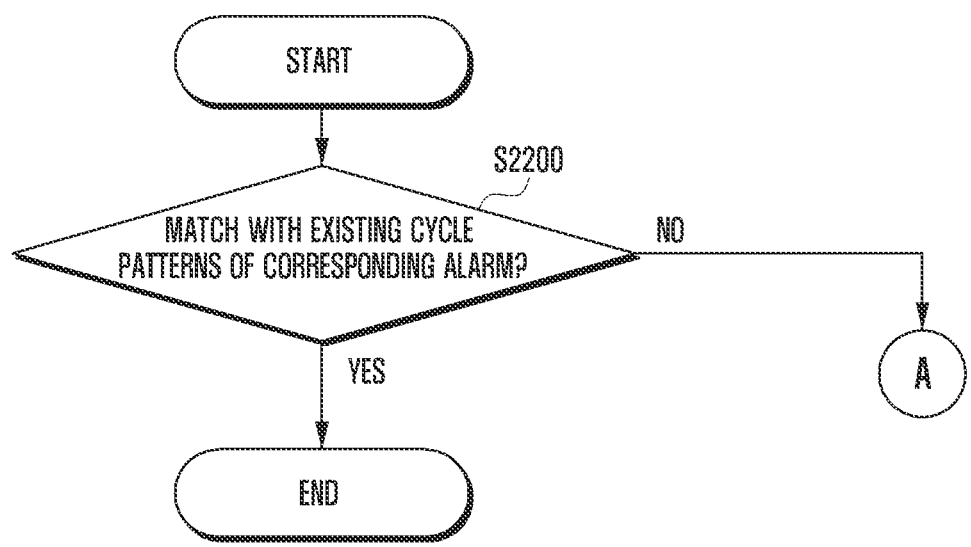
FIGS. 22 and 23 illustrate a procedure for unusual behavior detection according to an embodiment of the present disclosure.
Figure 23:
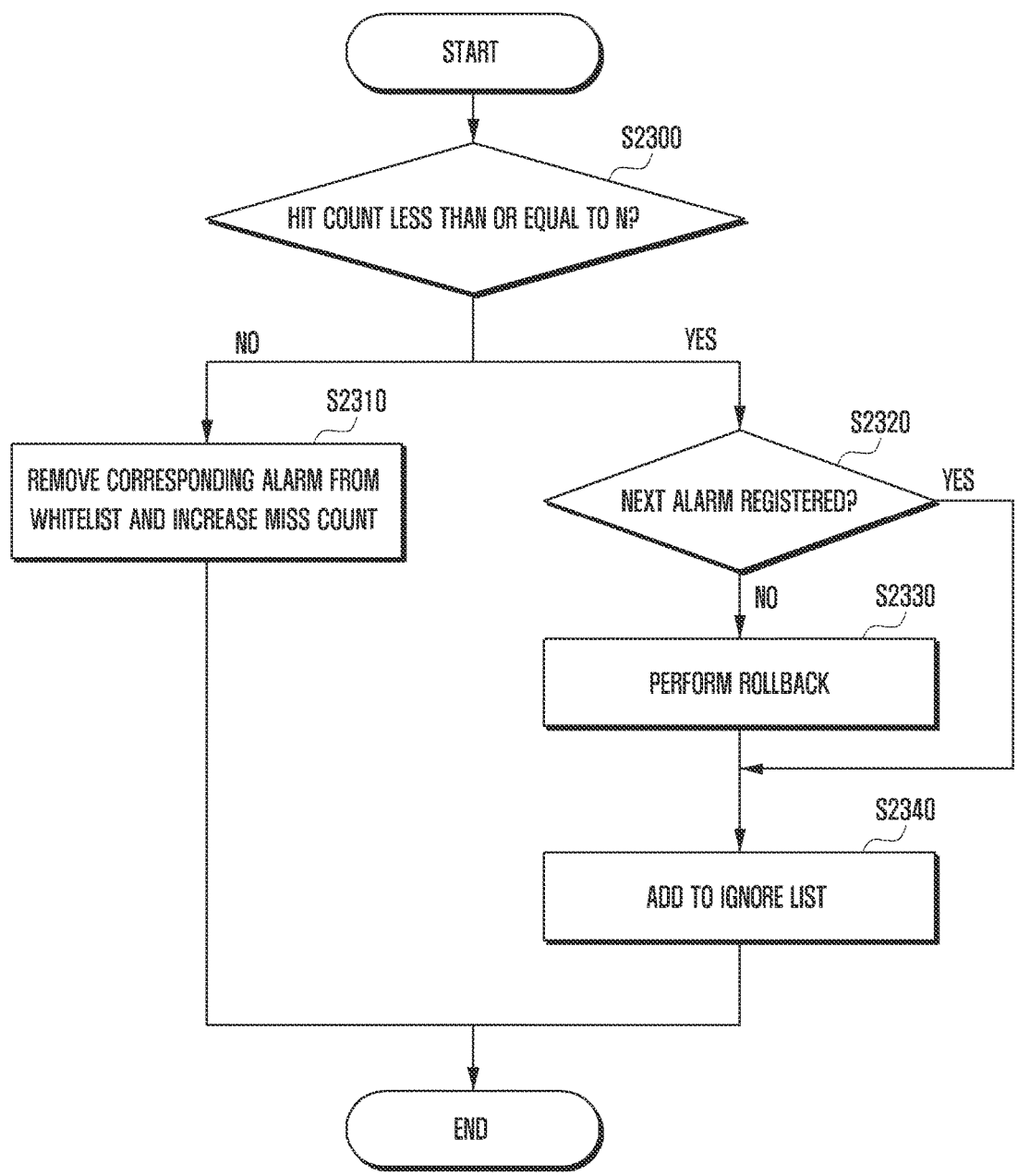

FIGS. 22 and 23 illustrate a procedure for unusual behavior detection according to an embodiment of the present disclosure.

Referring to FIGS. 22 and 23, at operation S2200, the controller 220 checks whether a repetitive synchronization activity associated with an alarm to be checked for abnormal action matches existing cycle patterns of a corresponding alarm. Here, a cycle pattern indicates cycles of data transmissions or receptions of an application caused by triggering of an alarm associated with a repetitive synchronization activity. For example, cycle patterns of repetitive synchronization activities are as follows.

1: H-H-H-H
2: M-H-M-H
3: M-M-H-M-M-H

Here, H indicates a hit, i.e., a presence of traffic generated by the corresponding application after alarm triggering, and M indicates a miss, i.e., an absence of traffic generated by the corresponding application after alarm triggering.

In addition, some cycle patterns are treated as an exception as follows.

M-H-H->H-H
H-M->M

When the repetitive synchronization activity does not match the existing cycle patterns, the procedure proceeds to operation S2300 at which the controller 220 checks whether the hit count of the repetitive synchronization activity is less than or equal to N. Here, N indicates the hit count immediately before the period is changed due to synchronization performed after the application is added to the whitelist 1416. In the event that the hit count is 4 times, N is 3 when the alarm trigger time is changed.

If traffic is generated more than N times, the procedure proceeds to operation S2310 at which the controller 220 removes information on the repetitive synchronization activity from the whitelist 1416 and increases the miss count, or in other words, removes the corresponding alarm from the whitelist 1416 and increases the miss count. Alternatively, the controller 220 may decrease the hit count of the repetitive synchronization activity instead of increasing the miss count.

If traffic is generated N times or less, the procedure proceeds to operation S2320 at which the controller 220 checks whether a next alarm is registered.

If a next alarm is registered, the procedure proceeds to operation S2340 at which the controller 220 adds information on the repetitive synchronization activity to the ignore list 1414. When the next alarm is registered after network traffic is not generated for the alarm associated with the repetitive synchronization activity, the controller 220 adds information on the repetitive synchronization activity to the ignore list 1414 and sustains the existing alarm time without a separate control operation. The controller 220 may examine whether the next alarm is registered by comparing alarm information of the currently changed application with a registration list of alarms.

If a next alarm is not registered, the procedure proceeds to operation S2330 at which the controller 220 performs a roll-back operation. Here, when a next alarm is not registered, the controller 220 may control an operation so that a recovery function is executed. The recovery function causes the application to normally work by identifying information on the alarm generating an abnormal action and registering the next alarm with the original alarm time on the basis of the identified information. Thereafter, at operation S2340, the controller 220 adds information on the repetitive synchronization activity to the ignore list 1414.

Operation S2030 of FIG. 20 may include operations S2200 to S2330 of FIGS. 22 and 23. While operation S2030 is performed, operation S2200 may be executed when the repetitive synchronization activity associated with the alarm to be checked for abnormal action is contained in the whitelist 1416.

Figure 24:
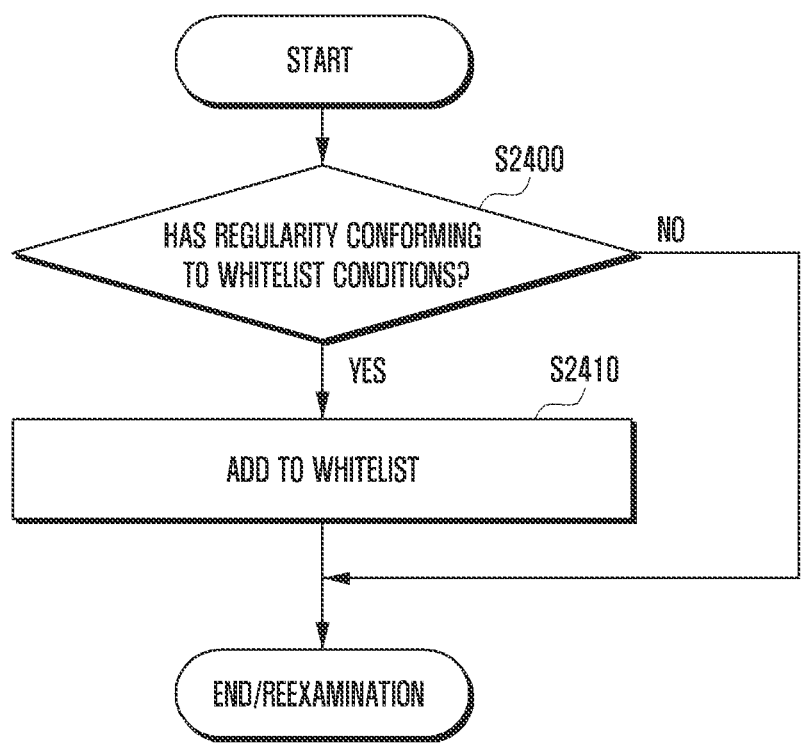
FIG. 24 illustrates another procedure for unusual behavior detection according to an embodiment of the present disclosure.

FIG. 24 illustrates another procedure for unusual behavior detection according to an embodiment of the present disclosure.

Referring to FIG. 24, at operation S2400, the controller 220 checks whether the repetitive synchronization activity associated with the alarm to be checked for abnormal action has regularity so that the cycle patterns conform to whitelist conditions.

If the whitelist conditions are matched, the procedure proceeds to operation S2410 at which the controller 220 adds information on the repetitive synchronization activity to the whitelist 1416. The controller 220 may determine that the alarm is not an abnormal alarm. Conditions descried in FIG. 18 may be used as whitelist conditions.

If whitelist conditions are not matched, the controller 220 ends the procedure of FIG. 24 and performs reexamination.

Operation S2030 of FIG. 20 may include operations S2400 and S2410 of FIG. 24. While operation S2030 is performed, operation S2400 may be executed when the repetitive synchronization activity associated with the alarm to be checked for abnormal action is contained in the watch list 1412.

Meanwhile, it is known to those skilled in the art that blocks of a flowchart or sequence diagram and a combination of flowcharts may be represented and executed by computer program instructions. These computer program instructions may be loaded on a processor of a general purpose computer, special purpose computer or programmable data processing equipment, or any other similar and/or suitable hardware element that may perform processing of computer program instructions. When the computer program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an Field Programmable Gate Array (FPGA) and/or Application Specific Integrated Circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The terminal of the present disclosure may be one of portable electronic devices including a mobile phone, Personal Digital Assistant (PDA), navigation aid, digital broadcast receiver, and Portable Multimedia Player (PMP).

The above description is provided to assist in a comprehensive understanding of various embodiments of the present disclosure. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method for application synchronization by a terminal, the method comprising:
   receiving a first alarm registration request for an application;
   determining whether a first alarm corresponding to the first alarm registration request is triggered;
   determining whether data associated with the application corresponding to the first alarm registration request is transmitted or received within a predetermined time interval since the first alarm is triggered, if the first alarm corresponding to the first alarm registration request is triggered; and
   estimating a period of the application corresponding to the first alarm registration request, if the data is transmitted or received within the predetermined time interval since the first alarm is triggered,
   wherein an execution time of a synchronization operation is determined based on whether a synchronization operation identifier associated with the first alarm registration request is on a first list, and
   wherein the synchronization operation identifier is added to a second list, if the data is not transmitted or received within the predetermined time interval since the first alarm is triggered.

2. The method of claim 1, further comprising:
determining whether the synchronization operation identifier associated with the first alarm registration request is on the first list; and
adjusting, if the synchronization operation identifier associated with the first alarm registration request is on the first list, an execution time of a repetitive synchronization operation, which is associated with the first alarm registration request, according to period information corresponding to the synchronization operation identifier.

3. The method of claim 2, further comprising:
determining, if the synchronization operation identifier associated with the first alarm registration request is not on the first list, whether a second alarm registration request and a third alarm registration request corresponding to the first alarm registration request are received before the first alarm registration request is received;
determining, if the second alarm registration request and the third alarm registration request corresponding to the first alarm registration request are received before the first alarm registration request is received, a periodicity of the first alarm registration request based on gaps between trigger times of the first alarm registration request, the second alarm registration request and the third alarm registration request;
generating, if the first alarm registration request is determined as having the periodicity, period information based on the gaps between the trigger times; and
adding the synchronization operation identifier related to the first alarm registration request and the period information to the first list.

4. The method of claim 3, further comprising:
adding the synchronization operation identifier related to the first alarm registration request to a second list, when the first alarm registration request is determined as not having the periodicity.

5. The method of claim 4, further comprising:
adding, if at least two alarm registration requests corresponding to the first alarm registration request are not received before the first alarm registration request is received, the synchronization operation identifier related to the first alarm registration request to a third list so that the synchronization operation identifier is associated with the trigger time of the first alarm registration request.

6. The method of claim 5, further comprising:
deleting the synchronization operation identifier related to the first alarm registration request from the first list, the second list and the third list, if the application corresponding to the first alarm registration request is updated.

7. A terminal supporting application synchronization, the terminal comprising:
at least one processor configured to:
receive a first alarm registration request for an application,
determine whether a first alarm corresponding to the first alarm registration request is triggered,
determine whether data associated with the application corresponding to the first alarm registration request is transmitted or received within a predetermined time interval since the first alarm is triggered, if the first alarm corresponding to the first alarm registration request is triggered, and
estimate a period of the application corresponding to the first alarm registration request, if the data is transmitted or received within the predetermined time interval since the first alarm is triggered; and
a communication unit configured to send and receive data under control of the at least one processor,
wherein an execution time of a synchronization operation is determined based on whether a synchronization operation identifier associated with the first alarm registration request is on a first list, and
wherein the synchronization operation identifier is added to a second list, if the data is not transmitted or received within the predetermined time interval since the first alarm is triggered.

8. The terminal of claim 7, wherein the at least one processor is further configured to:
determine whether the synchronization operation identifier associated with the first alarm registration request is on a first list, and
adjust, if the synchronization operation identifier associated with the first alarm registration request is on the first list, the execution time of a repetitive synchronization operation associated with the first alarm registration request according to period information corresponding to the synchronization operation identifier.

9. The terminal of claim 8, wherein the at least one processor is further configured to:
determine, if the synchronization operation identifier associated with the first alarm registration request is not on the first list, whether a second alarm registration request and a third alarm registration request corresponding to the first alarm registration request are received before the first alarm registration request is received,
determine, if the second alarm registration request and the third alarm registration request corresponding to the first alarm registration request are received before the first alarm registration request is received, a periodicity of the first alarm registration request based on gaps between trigger times of the first alarm registration request the second alarm registration request and the third alarm registration request,
generate, if the first alarm registration request is determined as having the periodicity, period information based on the gaps between the trigger times, and
add the synchronization operation identifier related to the first alarm registration request and the period information to the first list.

10. The terminal of claim 9, wherein the at least one processor is further configured to add the synchronization operation identifier related to the first alarm registration request to a second list, when the first alarm registration request is determined as not having the periodicity.

11. The terminal of claim 10, wherein the at least one processor is further configured to add, when at least two alarm registration requests corresponding to the first alarm registration request are not issued before the first alarm registration request is issued, the synchronization operation identifier related to the first alarm registration request to a third list so that the synchronization operation identifier is associated with the trigger time of the first alarm registration request.

12. The terminal of claim 11, wherein the at least one processor is further configured to delete the synchronization operation identifier related to the first alarm registration request from the first list, the second list and the third list, if the application corresponding to the first alarm registration request is updated.

* * * * *